(12) United States Patent
Makino et al.

(10) Patent No.: US 6,416,068 B2
(45) Date of Patent: Jul. 9, 2002

(54) VEHICLE HAVING DAMPING FORCE GENERATING MECHANISM

(75) Inventors: Hiroki Makino; Tsutomu Tomizawa, both of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 104 days.

(21) Appl. No.: 09/725,104

(22) Filed: Nov. 29, 2000

Related U.S. Application Data

(62) Division of application No. 09/040,476, filed on Mar. 18, 1998.

(30) Foreign Application Priority Data

Mar. 18, 1997 (JP) .............................................. 9-064714
Mar. 18, 1997 (JP) .............................................. 9-064715

(51) Int. Cl.⁷ .............................................. B60G 15/00
(52) U.S. Cl. ............................ 280/124.1; 280/124.177; 280/276
(58) Field of Search ................. 280/124.1, 124.129, 280/124.177, 276; 267/154, 279, 273, 140.2, 140.3; 180/300

(56) References Cited

U.S. PATENT DOCUMENTS

| | | | |
|---|---|---|---|
| 4,433,851 A | * | 2/1984 | Miyakoshi et al. ......... 280/276 |
| 4,458,888 A | | 7/1984 | Wolf et al. |
| 4,834,351 A | | 5/1989 | Freudenberg et al. |
| 4,865,299 A | | 9/1989 | Goto |
| 5,427,208 A | * | 6/1995 | Motobu et al. ............. 324/512 |
| 6,145,858 A | * | 11/2000 | Foulquier .............. 280/124.13 |

FOREIGN PATENT DOCUMENTS

| | | |
|---|---|---|
| JP | Sho5749432 | 10/1982 |
| JP | 187608 A | 8/1987 |

* cited by examiner

Primary Examiner—Paul N. Dickson
Assistant Examiner—Faye M. Fleming
(74) Attorney, Agent, or Firm—Birch, Stewart, Kolasch & Birch, LLP

(57) ABSTRACT

An inexpensive damping force generating mechanism capable of generating both a compression side damping force and a tensile side damping force has a simple, lightweight structure. The damping force generating mechanism provides an inexpensive axle suspension capable of simplifying the suspension structure, reducing the weight, and effectively utilizing space. The damping force generating mechanism includes an elastic body which generates a damping force when being pressed. An internal pressure generating member is inserted in the elastic body and resists the pressing force.

24 Claims, 23 Drawing Sheets

VEHICLE HAVING DAMPING FORCE GENERATING MECHANISM

This application is a divisional of co-pending application Ser. No. 09/040,476, filed on Mar. 18, 1998, the entire contents of which are hereby incorporated by reference.

BACKGROUND OF THE INVENTION

1. Field of the Invention

The present invention relates to a damping force generating mechanism for generating a damping force by pressing an elastic body.

2. Description of the Background Art

A damping force generating mechanism is used for various portions required for absorbing vibration, for example, used for a so-called bottom link type suspension of a motorcycle in which a front wheel is suspended from lower end portions of a front fork through links. A general example of such a bottom link type suspension is shown in FIG. 16 (see Japanese Patent Laid-open No. Sho 62-187608).

Referring to FIG. 16, there is shown a scooter type motorcycle 01. A steering shaft 03 is turnably fitted in a head pipe 02. A pair of right and left front forked portions 04 are integrally mounted on the lower end of the steering shaft 03. A front wheel 06 is suspended from the lower ends of the front forked portions 04 through rocking arms 05 as link members.

With respect to the rocking arm 05, the base end thereof is pivotably supported on the lower end portion of the front forked portion 04, and the free end portion thereof rotatably supports the front wheel 06. A suspension spring 07 is interposed between the upper portion of the front forked portion 04 and an approximately central portion of the rocking arm 05.

A shock load applied to the front wheel from irregularities on the ground is damped by the suspension springs 07. However, when a shock load is applied with an abrupt shock load, the suspension springs are largely rebounded after being contracted once.

In an example described in Japanese Patent Publication No. Sho 57-49432, as shown in FIG. 17, a front end of a link 012 is pivotally supported on the lower end portion of a front forked portion 011 containing a hydraulic damping mechanism. A front wheel 013 is rotatably supported on a central portion of the link 012. A subcushion unit 14 is interposed between the rear end of the link 012 and the central portion of the front forked portion 011.

The subcushion unit 014 includes a cylindrical main body 015 pivotally mounted on the front forked portion 011. A piston 016 is slidably inserted in the cylindrical main body 015 and is connected to a leading end of a rod 017 pivotally mounted on the link 012. A cushion rubber 018 utilized as a damping member is inserted in the cylindrical main body 015 in such a manner as to be mounted on the upper surface of the piston 016. A stopper rubber 019 utilized as a stopper member is inserted in the cylindrical main body 015 in such a manner as to be mounted on the lower surface of the piston 016.

The subcushion unit 014 thus generates a compression side damping force by the cushion rubber 018, and also generates a tensile side damping force by the stopper rubber 019. Consequently, the subcushion unit 014 can suppress both the bound and rebound of the front wheel 013.

The above subcushion unit 014, however, has a disadvantage. Since the piston 016 is slid in the cylindrical main body 015, and the cushion rubber 018 and the stopper rubber 019 are separately provided on the upper and lower surfaces of the piston 016, the mechanism is complicated in structure, being heavy and expensive.

SUMMARY OF THE INVENTION

In view of the foregoing, an object of the present invention is to provide an inexpensive damping, force generating mechanism capable of generating both a compression side damping force and a tensile side damping force with a simple, lightweight structure.

To achieve the above object, a damping force generating mechanism is provided including an elastic body which generates a damping force when being pressed, and an internal pressure generating member inserted in the elastic body which resists the pressing force.

With this configuration, the mechanism enables a large displacement due to bending deformation of the elastic body and thereby it enables absorption of a sufficient energy. The creep generated upon bending deformation of the elastic body can be reduced by repulsion of the internal pressure generating member inserted in the elastic body accompanied by compressed deformation of the internal pressure generating member. Accordingly, a damping force generating mechanism can be obtained which is capable of reducing the characteristic change due to permanent set. The restoring ability after release of a load is also excellent due to repulsion of the internal pressure generating member.

The internal pressure generating member may comprise a spring member. With this configuration, the creep of the elastic body is reduced by repulsion of the spring member accompanied by the compression thereof. Accordingly, it is possible to make the characteristic change due to permanent set smaller and to enhance the restoring ability.

The internal pressure generating member may comprise a partitioned chamber containing a compressive gas or liquid. With this configuration, the creep of the elastic member is reduced by repulsion of a compressive gas or liquid compressed and deformed together with the partitioned chamber. Accordingly, it is possible to make the characteristic change due to permanent set smaller and to enhance the restoring ability.

The internal pressure generating member may comprise an elastic organic material. The internal pressure generating member, which is made from the organic material, can be easily molded in a shape most suitable for the application. The organic material may have a hollow portion. With this configuration, when the organic material is compressed, a specific repulsive force can be obtained by the presence of the hollow portion. The organic material may be a polyester-urethane based material. With this configuration, it is possible to obtain a specific repulsive force by a large elasticity of a polyester-urethane based material.

To further achieve the object of the invention, a damping force generating mechanism is provided which includes an elastic body which generates a damping force when being pressed, and a restricting wall for suppressing expansion of the elastic body generated in the direction perpendicular to the pressing direction of the elastic body.

When the elastic body is pressed, the expansion of the elastic body in the direction perpendicular to the pressing direction is restricted by the restricting wall. As such, the force of the elastic body applied to the restricting wall becomes larger and the sliding resistance of the elastic body is increased. As a result, a desirable relationship of load to displacement can be easily obtained by the action of the sliding resistance of the elastic body in addition to the elastic characteristic of the elastic body.

The elastic body may be separated from the restricting wall with a gap therebetween at the beginning of pressing of the elastic body, and brought into contact with the restricting wall with progressive pressing of the elastic body.

At the beginning of the pressing, since the elastic body is not brought into contact with the restricting wall due to the gap therebetween, the load is gradually increased with an increase in displacement only by the elastic characteristic of the elastic body. However, as the elastic body is pressed to a state where the elastic body is in contact with the restricting wall, the load is rapidly increased with an increase in displacement by a combination of the sliding resistance of the elastic body and the elastic characteristics of the elastic body. As a result, a desirable relationship of the load to the displacement can be obtained.

The contact area of the elastic body with the restricting wall may be enlarged with further progress of pressing of the elastic body. With this configuration, after the pressed elastic body is brought into contact with the restricting wall, the contact area of the elastic body with the restricting wall is enlarged and thereby the sliding resistance of the elastic body is increased. As a result, a desirable smooth relationship of the increased load to the increased displacement can be obtained.

The elastic body may have a hollow portion opened to the restricting wall side, with an intermediate elastic body inserted in the hollow portion. Therefore, when the elastic body is pressed, the intermediate elastic body is compressed, being swelled out of the opening of the hollow portion, and is brought in press-contact with the restricting wall.

When the elastic body is pressed, sliding resistance is generated due to the contact of the elastic body with the restricting wall in addition to the elastic characteristics of the elastic body, and also the sliding resistance of the intermediate elastic body due to the pressing contact of the restricting wall with the intermediate elastic body compressed and swelled from the opening of the hollow portion. As a result, a desirable relationship of the load to the displacement of the elastic body can be easily obtained.

To further achieve the object of the invention, a damping force generating mechanism is provided which includes an elastic body which generates a damping force when being pressed, a hollow portion opened in the elastic body in the direction perpendicular to the pressing direction, an intermediate elastic body inserted in the hollow portion, and a restricting wall provided opposite to the opening of the hollow portion. Thus, when the elastic body is pressed, the intermediate elastic body is compressed, being swelled out of the opening of the hollow portion, and is brought into pressing contact with the restricting wall.

At the beginning of the pressing of the elastic body, elastic characteristics of the elastic body and the intermediate elastic body are generated. However, as the pressing of the elastic body proceeds, the intermediate elastic body is compressed, being swelled out of the hollow portion of the elastic body, and is brought into contact with the restricting wall. Thus, sliding resistance of the intermediate elastic body is generated. As a result, a desirable relationship of the load to the displacement of the elastic body can be easily obtained.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitive of the present invention, and wherein.

DETAILED DESCRIPTION OF THE PREFERRED EMBODIMENT

Figure 1:
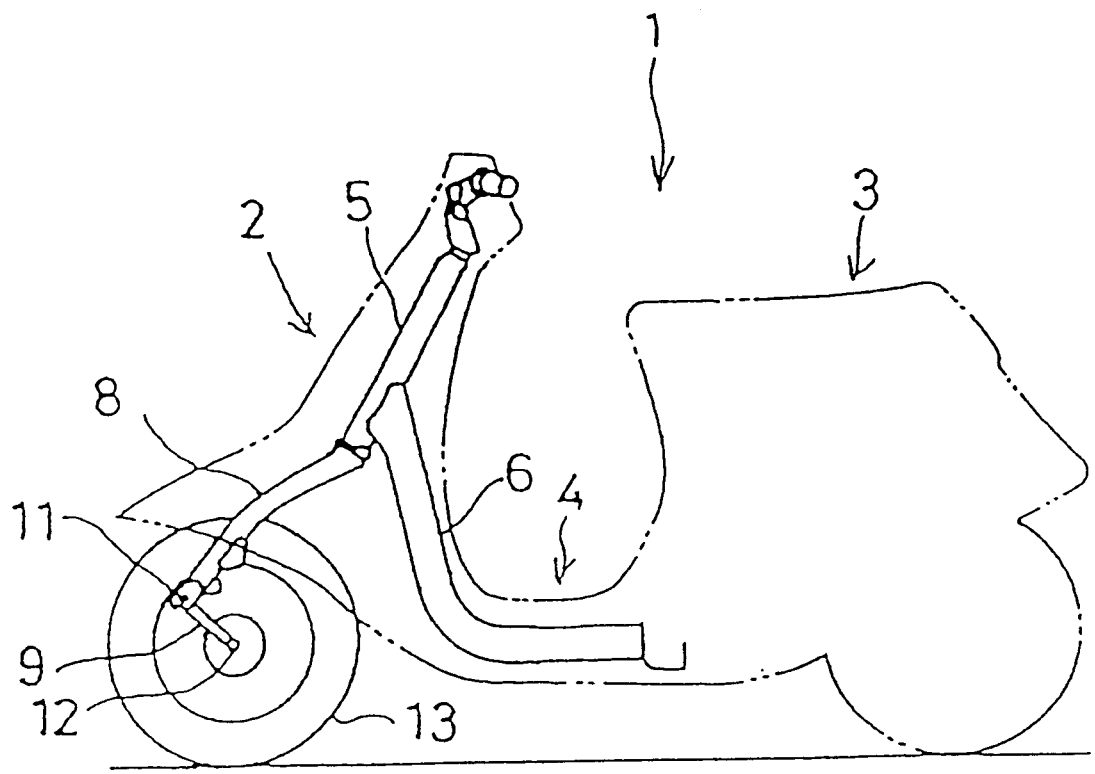
FIG. 1 is a side view of a scooter-type motorcycle including a wheel suspension to which a damping force generating mechanism according to a first embodiment is applied, with parts partially omitted.
Figure 2:
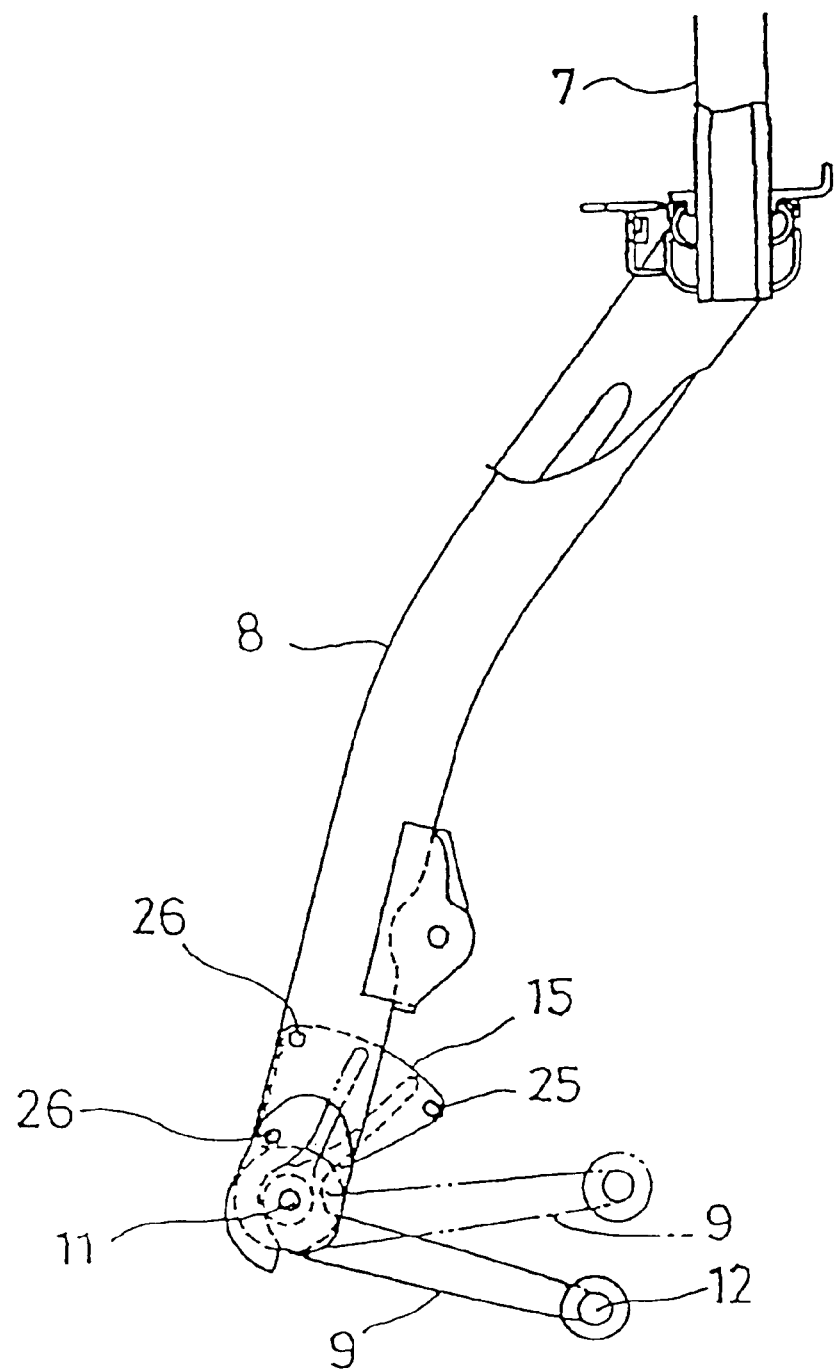
FIG. 2 is a side view of a front forked portion and the vicinity thereof.

A damping force generating mechanism according to a first embodiment is described with reference to FIGS. 1 to 10. FIG. 1 is a side view of a scooter-type motorcycle 1 including a wheel suspension to which a damping force generating mechanism in the embodiment is applied, with parts partially omitted.

A low level floor 4 is formed between a front portion 2 and a rear portion 3 of the body. A down frame 6 extends downwardly from a head pipe 5 provided on the front portion 2 of the body, being curved rearwardly from the lower end portion, and is integrated with the floor 4.

A steering shaft 7 is turnably fitted to the head pipe 5. A pair of right and left front forked portions 8 are integrally mounted on the lower end of the steering shaft 7, and they extend downwardly therefrom. A rocking arm 9 as a link member is pivotably supported at the lower end of each front forked portion 8 by means of a pivot arm bolt 11. A front wheel 13 is rotatably supported by the free ends of the rocking arms 9 through a front axle 12.

The front forked portion 8 is U-shaped in cross section with a front wall and both side walls. The right and left side walls at the lower end portion of the front forked portion 8 have bolt holes. A bush 14 provided in a base end pivot portion 9a of the rocking arm 9 is fitted between both side walls of the front forked portion 8 at a position corresponding to the bolt holes. The bush 14 is rotatably supported by a pivot arm bolt 11 passing through the bush 14 and the bolt holes of the side walls of the front forked portion 8. Each side of the base end pivot portion 9a of the rocking arm 9 is formed in a cylindrical shape having an enlarged diameter. A plate-like lever 10 is integrated with the outer peripheral surface of the cylindrical side portion of the base end pivot portion 9a and extends therefrom in the radial direction.

In a state in which the rocking arm 9 extends rearwardly from the base end pivot portion 9a, the lever 10 extends obliquely, upward at an angle of about 60 degrees relative to the rocking arm 9. That is, it extends between the front forked portion 8 and the rocking arm 9.

A fan-shaped case 15 is fixedly inserted in the front fork portion 8 at a position adjacent to the upper portion of the base end pivot portion 9a of the rocking arm 9.

Figure 5:
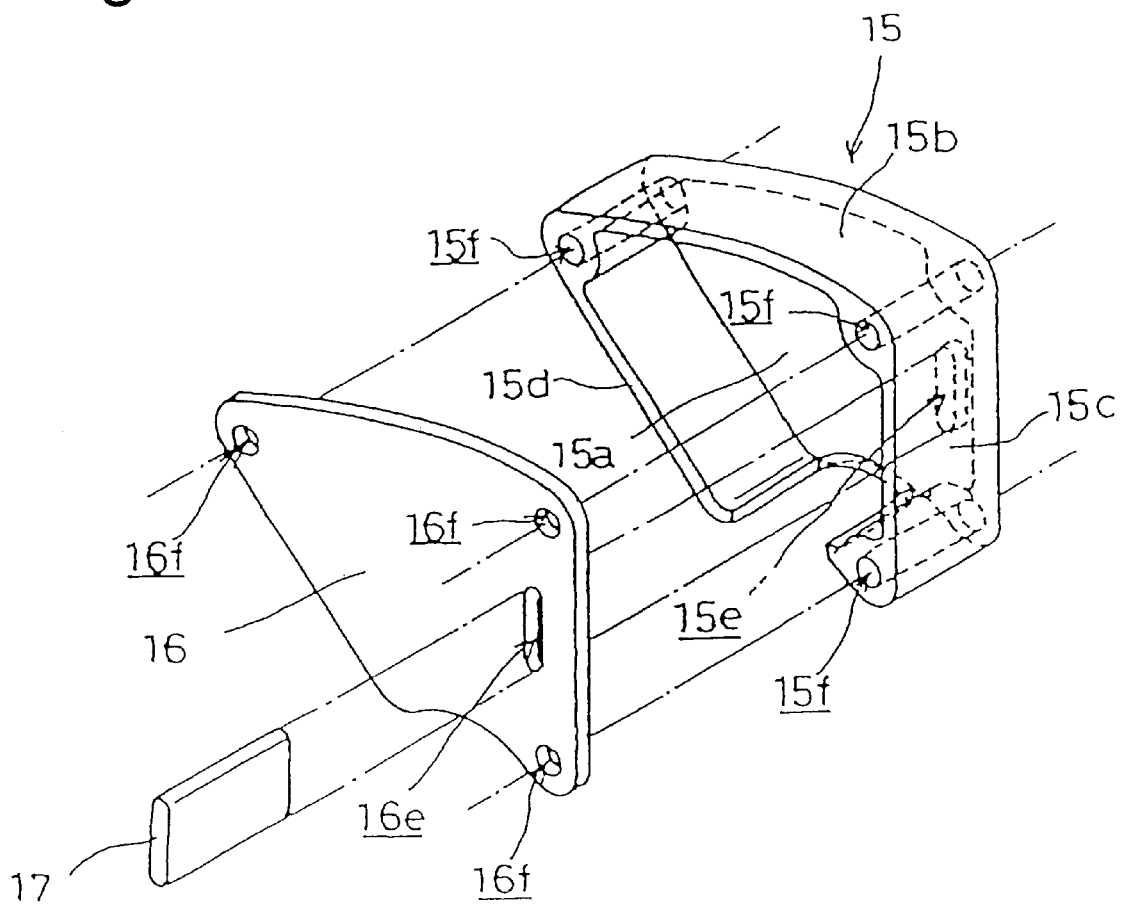
FIG. 5 is an exploded view in perspective of a case, lid member and locking piece.
Figure 6:
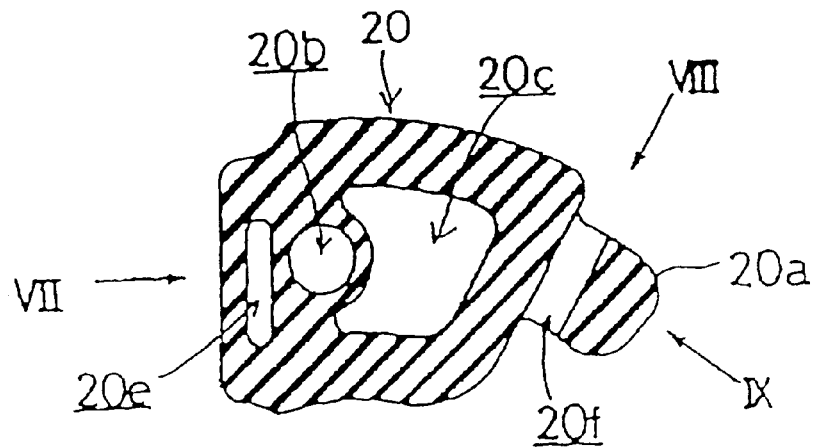
FIG. 6 is a sectional view of an elastic rubber body.
Figure 7:
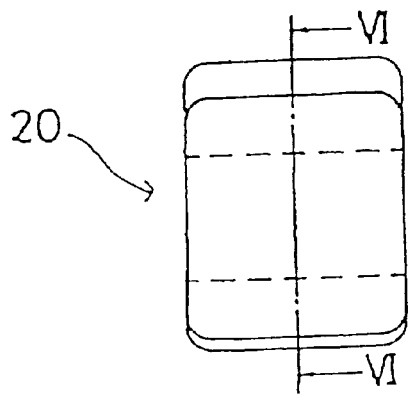
FIG. 7 is a view seen in the direction shown by arrow VII of FIG. 6.
Figure 8:
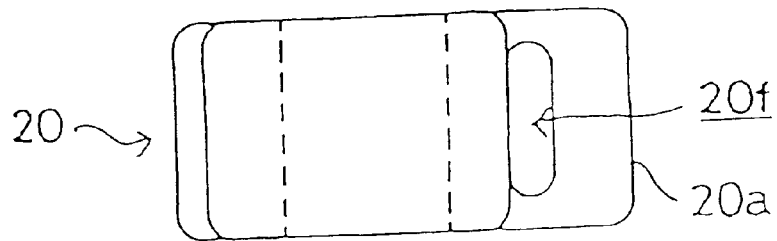
FIG. 8 is a view seen in the direction shown by arrow VIII of FIG. 6.
Figure 9:
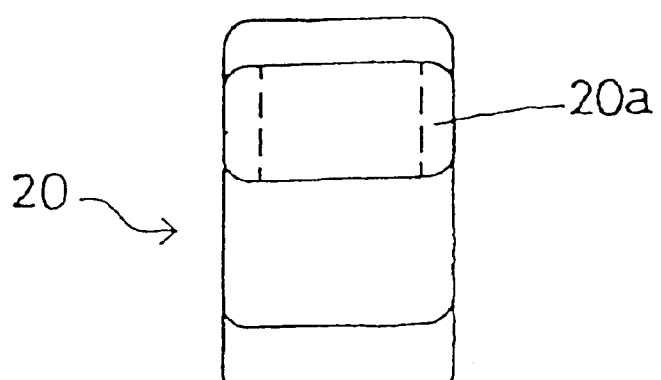
FIG. 9 is a view seen in the direction shown by arrow IX of FIG. 6.

As shown in FIG. 5, the case 15 is formed into a box-like shape having a fan-shaped side wall 15a, an outer peripheral wall 15b, a front wall 15c and a rear wall 15d. A slot 15e is formed in the side wall 15a along the front edge, and three circular holes 15f are formed in upper and lower ends of the front wall 15c and in the upper end of the rear wall 15d in such a manner as to pass therethrough in the right and left direction, that is, in the width direction.

As shown in FIG. 5, there is provided a plate-like lid member 16 opposed to the side wall 15a for blocking the opening of the case 15. The lid member 16, which is formed into the same fan-shape as that of the side wall 15a, has a slot 16e corresponding to the slot 15e, and three circular holes 16f corresponding to the circular holes 15f.

A locking piece 17 is locked in the slots 15e and 16e opposed to each other. In a state in which the lid member 16 is fitted to the ease 15, only the lower side of the case 15 is opened.

An elastic rubber body 20 is contained in the case 15 covered with the lid member 16. The elastic rubber body 20 is formed into a shape shown in FIGS. 6 to 9. That is, the elastic rubber body 20 has a fan-shaped cross section similar to but smaller than that of the inner space of the case 15, and also has a large projection 20a projecting from the rear surface of the fan-shaped cross section. In addition, corners at upper and lower ends of the front side of the fan-shaped cross section are slightly cut off.

A circular hole 20b and a large-sized irregular rectangular hole 20c are formed fore and aft in the elastic rubber body 20 having the above contour in such a manner as to pass through the elastic rubber body 20 in the width direction. Slots 20e and 20f are also formed in the elastic rubber body 20. The slot 20e (corresponding to the slot 15e of the above case 15) is disposed between the circular hole 20b and the front surface of the elastic rubber body 20 in such a manner as to extend in parallel to the front surface. The slot 20f passes through a base portion of the projection 20a in parallel to the rear surface of the elastic rubber body 20.

The elastic rubber body 20 exhibits a hysteresis characteristic of compression and tensile actions, and it has both elastic and damper functions.

The elastic rubber body 20, case 15, and the like are assembled as follows. The lever 10 integrated with the rocking arm 9 is made to pass through the slot 20f formed in the base portion of the projection 20a of the elastic rubber body 20, to be thus mounted in the elastic rubber body 20. The case 15 covers the elastic rubber body 20 from the left side, and the lid member 16 closes the case 15 from the right side. Thus, the lever 10 is in a state being inserted in the case 15 through the lower opening of the case 15.

The locking piece 17 is made to pass through the slot 15e of the case 15, the slot 20e of the elastic rubber body 20, and the slot 16e of the lid member 16, and hence to be fitted in the slots 15e, 20e and 16e. Then, a screw 25 is threaded into the circular hole 15f formed in the upper end portion of the rear wall 15d of the case 15 and in the circular hole 16f of the lid member 16 corresponding to the circular hole 15f, to thus integrally fix the case 15 to the lid member 16.

The case 15 covered with the lid member 20, which is mounted to the lever 10 through the elastic rubber body 20, is inserted into the recess on the back side of the front forked portion 8 to the extent that the front wall 15c of the case 15 is brought into contact with the bottom of the recess.

Each of the right and left side walls of the front fork portion 8 has circular holes at specific upper and lower positions along the bottom. The circular holes 15f and 16f of the case 15 and the lid member 16 are aligned with the above circular holes, and bolts 26 are made to pass through these circular holes and are attached to nuts. Accordingly, the case 15 and the lid member 16 are co-fastened to the front forked portion 8 with the bolts 26, to be thus fixed thereto.

Figure 3:
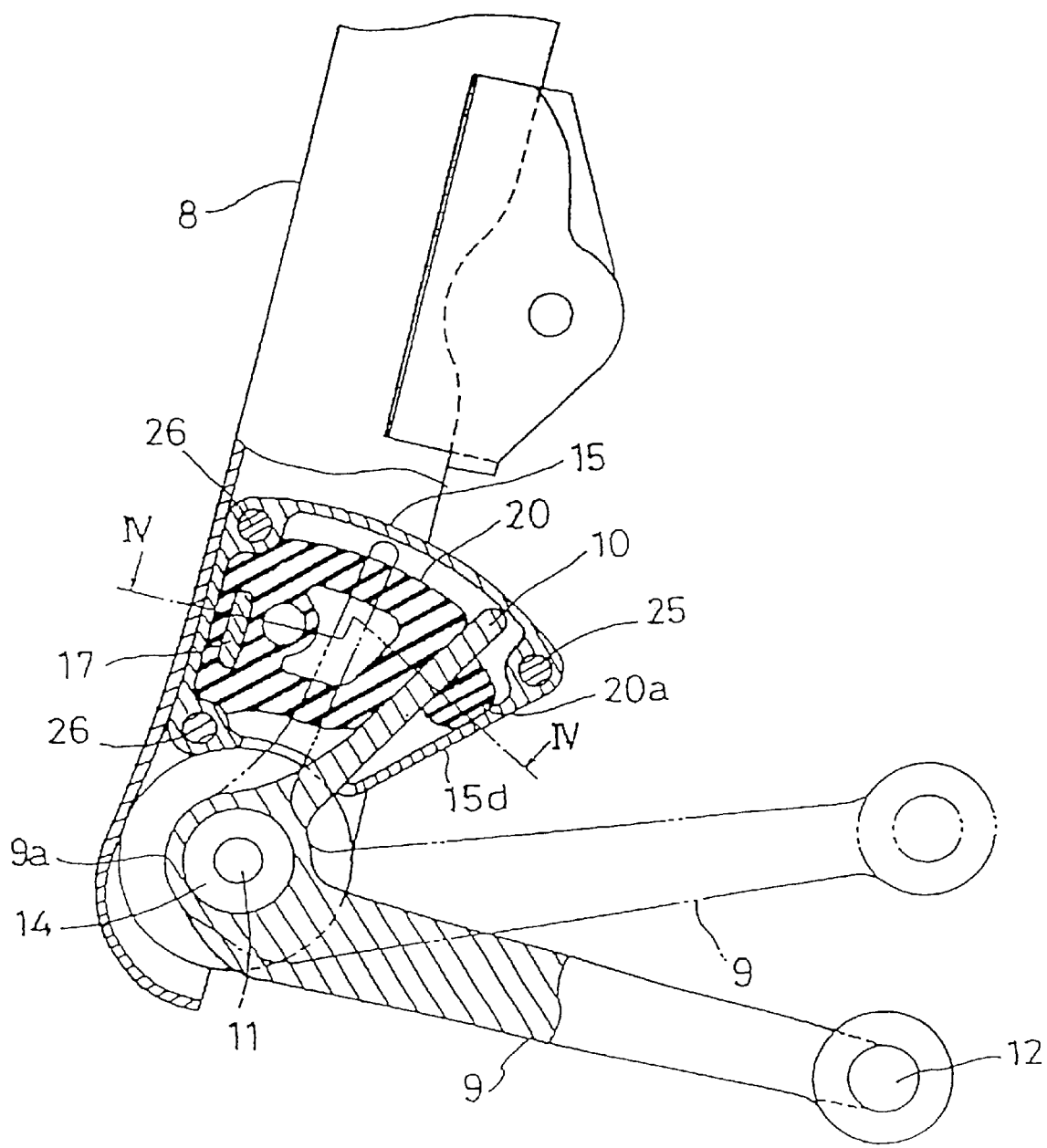
FIG. 3 is a sectional view of essential portions of the front fork portion.
Figure 4:
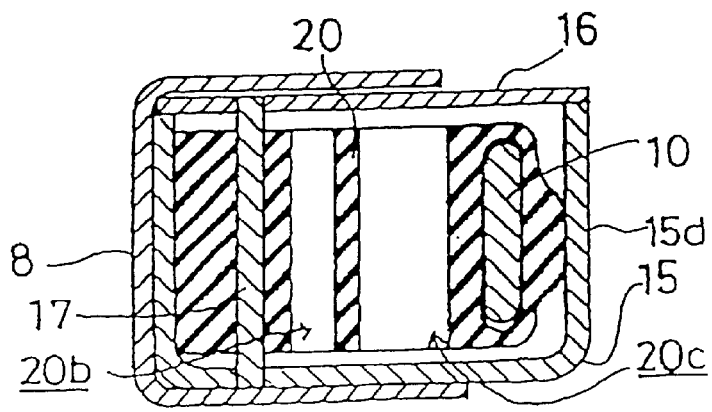
FIG. 4 is a sectional view taken on line IV—IV of FIG. 3.

In the assembled state, the elastic rubber body 20 is disposed in the case 15 as shown in FIGS. 3 and 4. That is, with respect to the elastic rubber body 20, the front end portion is positioned in a state being locked by the locking piece 17, the rear portion is held by the lever 10 inserted in the slot 20f, and the projection 20a projecting rearward is allowed to be brought in contact with the rear wall 15d of the case 15.

In this way, the front wheel suspension in this embodiment has a very simple structure that the elastic rubber 20 is interposed between the front forked portion 8 and the lever 10 in a state in which the front portion thereof is locked by the locking piece 17 and the rear portion thereof is locked by the lever 10.

When the front wheel 13 is applied with a shock generated by irregularities of the ground and the rocking arm 9 is rocked, the positional states of the rocking arm 9 and the lever 10 integrated with the rocking arm 9 are changed from states indicated by a solid line of FIG. 3 to states indicated by a two-dot chain line. As a result, the lever 10 compresses the elastic rubber body 20 in the forward direction, that is, on the front forked portion 8 side, and elastically deforms it, to thereby generates a compression side damping force.

Figure 10:
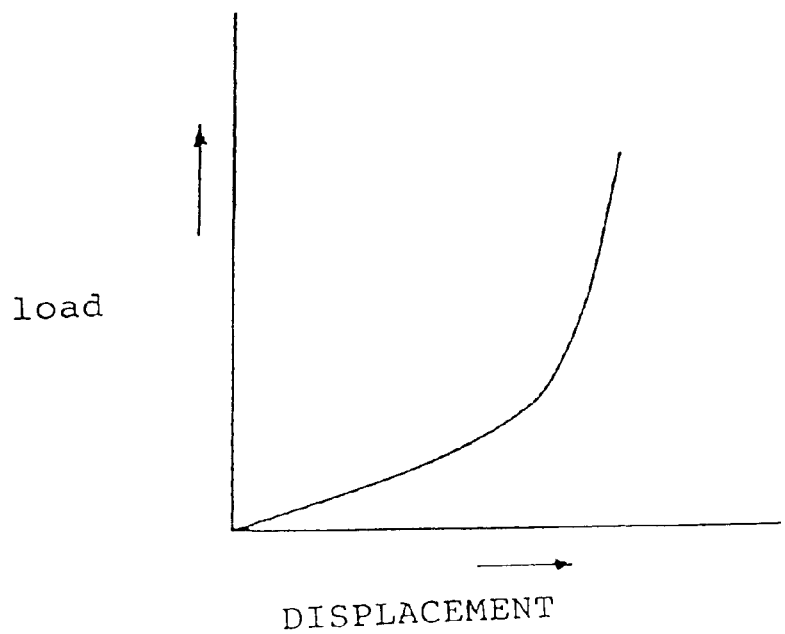
FIG. 10 is a graph showing an elastic characteristic of the elastic rubber body.

In this case, the elastic rubber body 20 has a progressive elastic characteristic shown in FIG. 10 in which the increasing ratio of a load to a displacement is large in a large displacement region as compared with a small displacement region. Specifically, in a small displacement region that only the irregular rectangular hole 20c of the elastic rubber body 20 is deformed, a compressive stress is moderately generated to the displacement, but in a large displacement region that not only the irregular rectangular hole 20c but also the circular hole 20b are deformed, the compressive stress is rapidly increased with the displacement.

On the other hand, when the rocking arm 9 and the lever 10 are reversely rocked, the main body of the elastic rubber body 20 generates a tensile damping force, and simultaneously the projection 20a is pressed and compressed by the rear wall 15d of the case 15, thus acting as a rebound stopper.

Accordingly, while the front wheel suspension in this embodiment has the simple structure in which the elastic rubber body 20 is interposed between the front fork portion 8 and the lever 10, it exhibits a desirable damping effect due to the function of the elastic rubber body 20 generating both a compression side damping force and a tensile side damping force thereby effectively absorbing shock applied from the ground to the front wheel 13.

In this way, the front wheel suspension in this embodiment does not require a pivot for supporting the elastic rubber body 20, and has no sliding portion for a piston or the like, so that it can obtain a stable damping characteristic without the occurrence of any sliding friction, thereby enhancing the durability with a simple, lightweight, and inexpensive structure.

It is to be noted that it becomes possible to obtain various other elastic characteristics of the elastic rubber body 20 by changing the shapes of the circular hole 20b and the irregular rectangular hole 20c of the elastic rubber body 20, and hence to easily provide an elastic body most suitable for each kind of vehicle.

Figure 11:
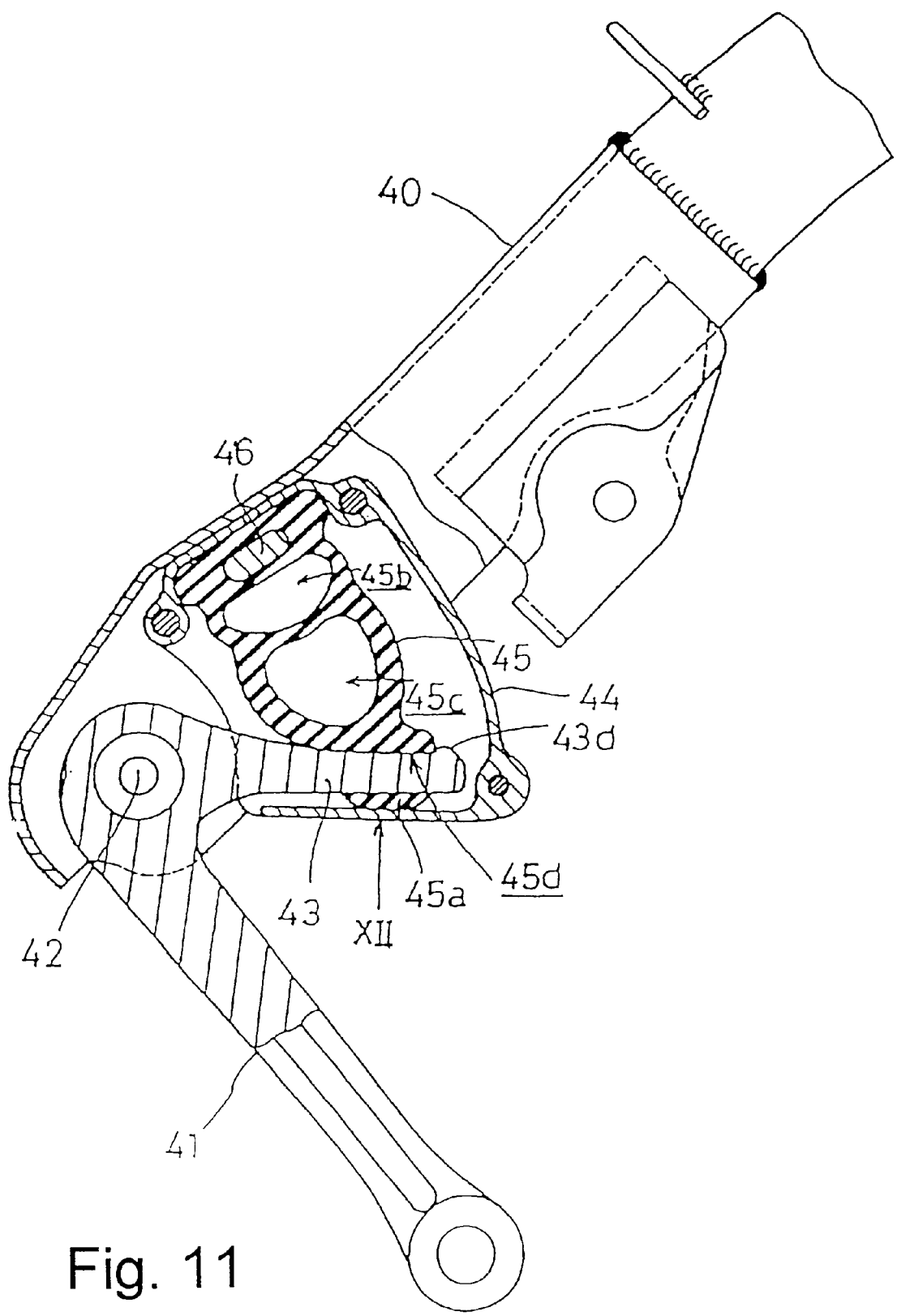
FIG. 11 is a sectional view of essential portions of a front forked portion according to a modification of the first embodiment.
Figure 12:
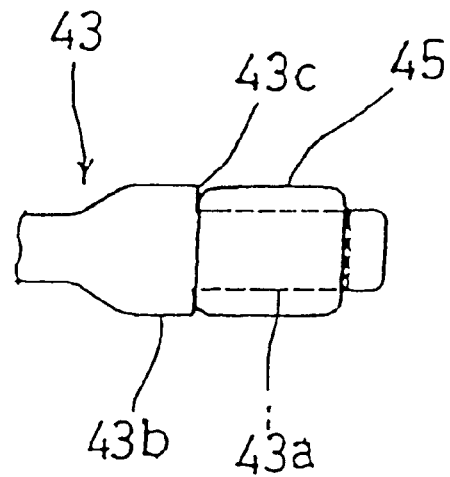
FIG. 12 is a view seen from in the direction shown by arrow XII of FIG. 11, showing a locking portion of a lever with an elastic rubber body.

Next, the structure of a front wheel suspension disposed at the lower end portion of a front forked portion 40 according to a modification of the first embodiment will be described with reference to FIGS. 11 and 12. This modification has the same basic structure as that of the first embodiment, except for slightly changed shapes of the parts. A base end pivot portion 41a of a rocking arm 41 is rockably supported, by means of a pivot arm bolt 42, at the lower end of the front forked portion 40. The rocking arm 41 has a plate-like lever 43 extending from the base end pivot arm portion 41a in the radial direction. A fan-shaped case 44 adjacent to the upper side of the base end pivot portion 41a of the rocking arm 41 is fixedly fitted in the front forked portion 40.

An elastic rubber body 45, which has throughholes 45b and 45c passing through the elastic rubber body 45 in the width direction, is fitted in the case 44. A locking piece 46 passes through the front portion of the elastic rubber body 45 and locks it. A lever 43 is inserted in a slot 45d formed in the rear portion of the elastic rubber body 45, and a projection 45a projecting rearwardly from the rear portion is allowed to be brought into contact with the rear wall of the case 44.

The lever 43 has a swelled portion 43b, a stepped portion 43c, and a flange portion 43d. As shown in FIG. 12, the swelled portion 43b is swelled right and left, that is, in the width direction on the base end side from a locking portion 43a to be locked with the elastic rubber body 45, and the stepped portion 43c is formed at the boundary between the locking portion 43a and swelled portion 43b. The flange portion 43d projects upward from the leading end of the lever 43, as shown in FIG. 11.

The lever 43 passes through the slot 45d of the elastic rubber body 45, and the elastic rubber body 45 is locked with the locking piece 43a. At the same time, the elastic rubber body 45 is held between the stepped portion 43c and the flange portion 43d of the lever 43. The sliding motion of the elastic rubber body 45 relative to the lever 43 is thus restricted by the stepped portion 43c and the flange portion 43d of the lever 43. This allows the elastic rubber body 45 to effectively generate a damping force.

Figure 13:
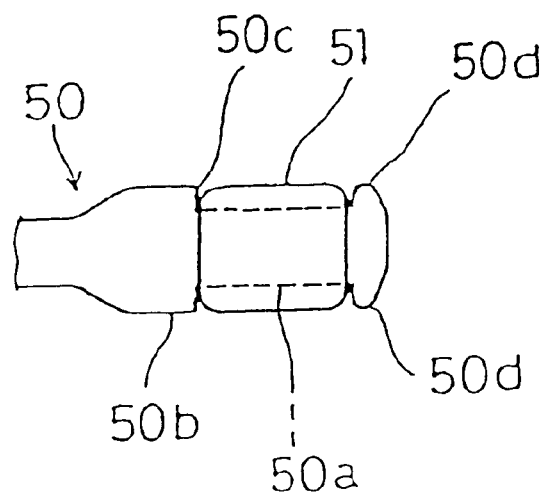
FIG. 13 is a view showing another example of the locking portion of the lever with the elastic rubber body shown in FIG. 12.

FIG. 13 shows another example of the lever. A lever 50 has a fitting portion 50c on the base end side of a locking portion 50a at the boundary between the locking portion 50a and a swelled portion 50b, and also has on the leading end side a flange portion 50d projecting in the right and left direction. An elastic rubber body 51 is held between the fitting portion 50c and the flange portion 50d of the lever 50, so that the sliding motion of the elastic rubber 45 relative to the lever 43 is restricted.

Figure 14:
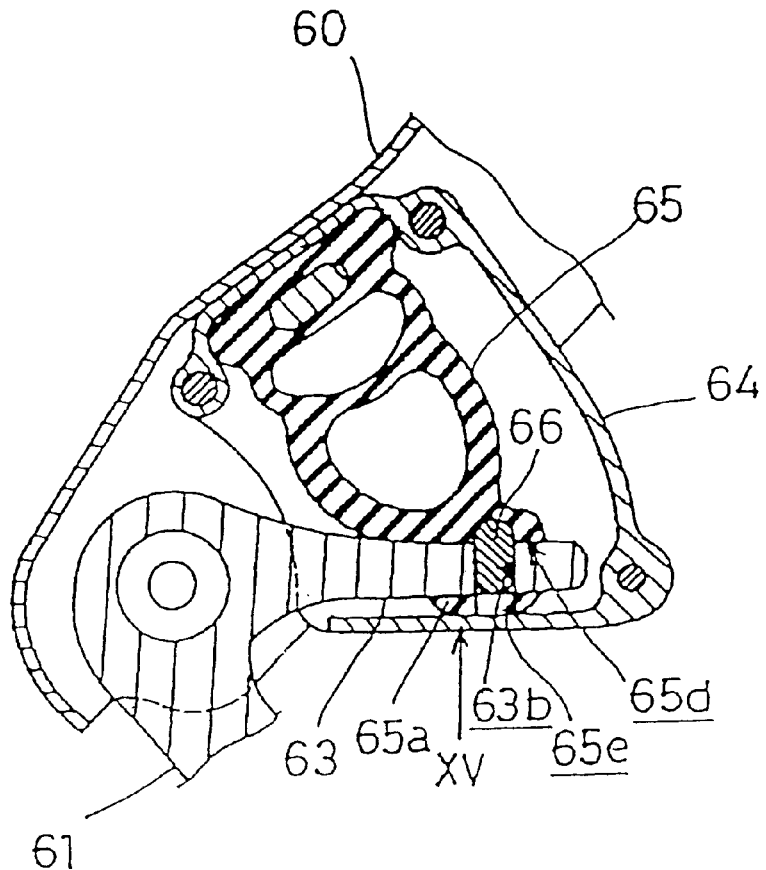
FIG. 14 is a sectional view of essential portions of a front forked portion according to another modification of the first embodiment.
Figure 15:
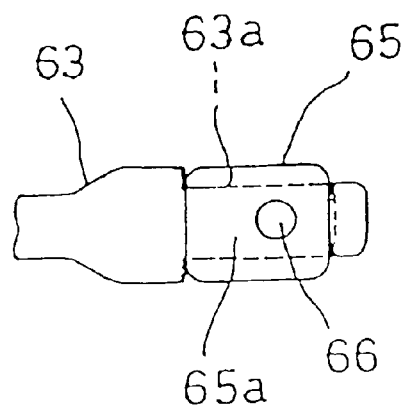
FIG. 15 is a view seen from in the direction shown by arrow XV of FIG. 14, showing a locking portion of a lever with an elastic rubber body.
Figure 16:
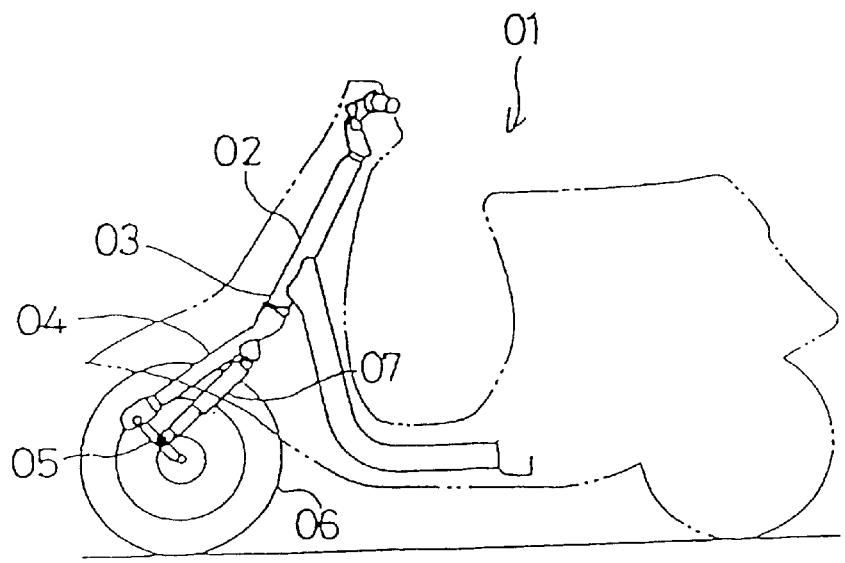
FIG. 16 is a view showing a motorcycle including a prior art front wheel suspension.
Figure 17:
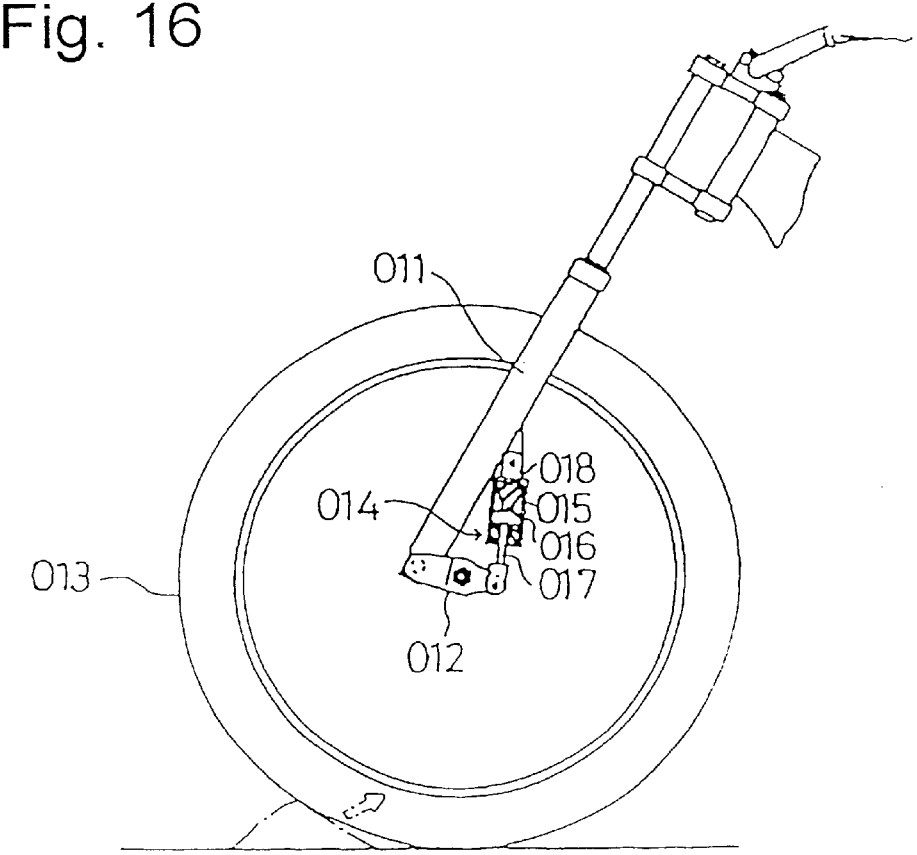
FIG. 17 is a sectional view showing another prior art front wheel suspension.

Next, another modification of the first embodiment will be described with reference to FIGS. 14 and 15. The modification, which also concerns a front wheel suspension provided on the lower end portion of a front forked portion 60, is substantially similar to the above modification shown in FIGS. 11 and 12 in terms of shapes of a rocking arm 61, a lever 63, a case 64, and an elastic rubber body 65, but is different therefrom in terms of the structure of restricting the sliding motion of the elastic rubber body 65 relative to the lever 63.

A circular hole 63b is formed in a plate-like locking portion 63a of the lever 63, and a circular hole 65e corresponding to the circular hole 63b is formed in the elastic rubber body 65. The circular hole 65e is continuous to a slot 65d formed in a rear projection 65a, and further to a recess formed in the opposed portion, to the slot 65d, of the rear portion of the elastic rubber body 65. A knock pin 66 is inserted in the circular hole 63b of the lever 63 and the circular hole 65e of the elastic rubber body 65.

Accordingly, the sliding motion of the elastic rubber body 65 relative to the lever 63 is restricted by the knock pin 66, so that the elastic rubber body 65 is allowed to effectively generate a damping force. The lever 63, which has no flange portion at the leading end thereof, is easily inserted in the slot 65d of the elastic rubber body 65 upon assembly.

Although description has been made by example of the front wheel suspension for a motorcycle in the above first embodiment and modifications thereof, the present invention can be applied to a rear wheel suspension, and used as a damper mechanism for a power transmission of an engine and a damper mechanism for a cam chain tensioner.

Hereinafter, a second embodiment of the present invention will be described with reference to FIGS. 18 to 23. In the second embodiment also concerning a front suspension mechanism as in the first embodiment, parts corresponding to those in the first embodiment are indicated by the same reference characters.

Figure 18:
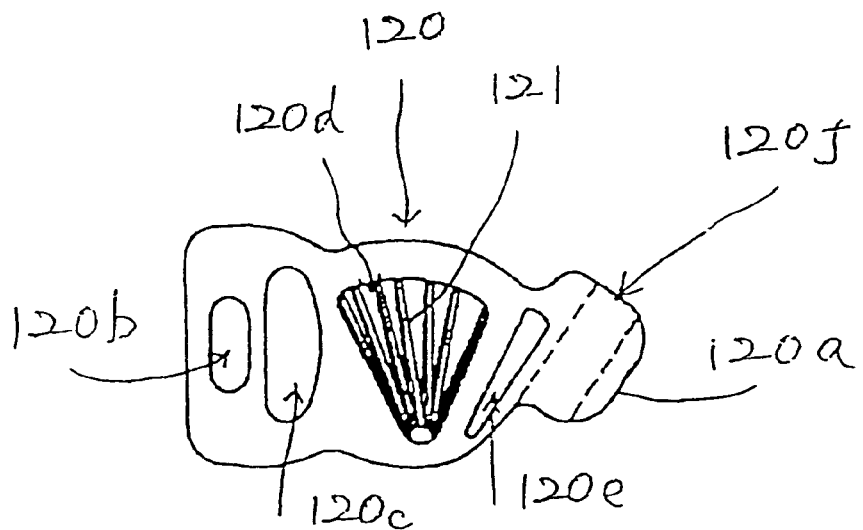
FIG. 18 is a side view of an elastic body containing a spring member according to a second embodiment.
Figure 19:
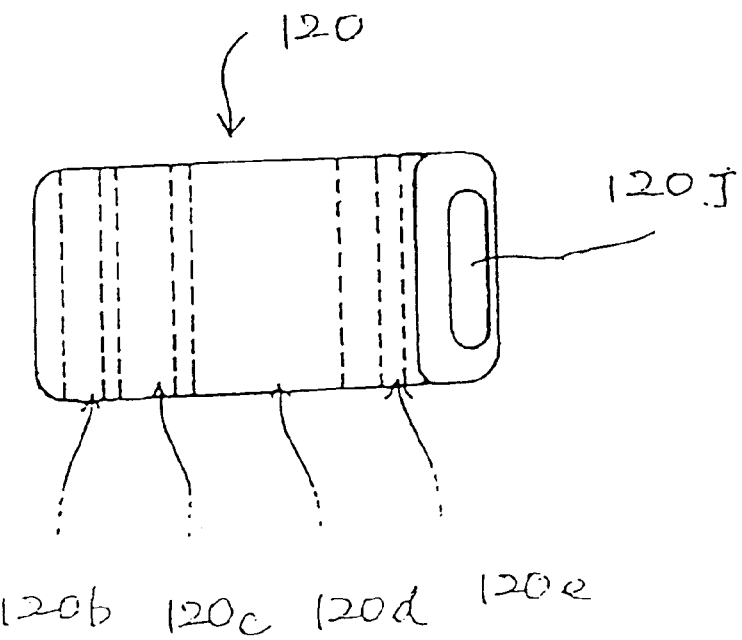
FIG. 19 is a top view of the elastic body shown in FIG. 18.

FIGS. 18 and 19 shows the second embodiment, in which four holes having different shapes and passing through an elastic rubber body 120i in the width direction are formed in the elastic rubber body 120. The four holes, an elliptic hole 120b (corresponding to the slot 15e of the case 15 in the previous embodiment), an irregularly elliptic hole 120c, a developed fan-shaped hole 120d, and a contracted fan-shaped hole 120e are arranged from the front side in this order. Further, a through-slot 120f is formed in the base portion of a projection 120a along the rear surface of the elastic rubber body 120.

A metal spring member 121 as an internal pressure generating member is inserted in the developed fan-shaped hole 120d. The spring member 121 is composed of radially extending plate springs arranged in a fan-shape corresponding to the internal space of the developed fan-shaped hole 120d. The spring member 121 is made repulsive against a compression side pressing force while generating an internal pressure.

Figure 20:
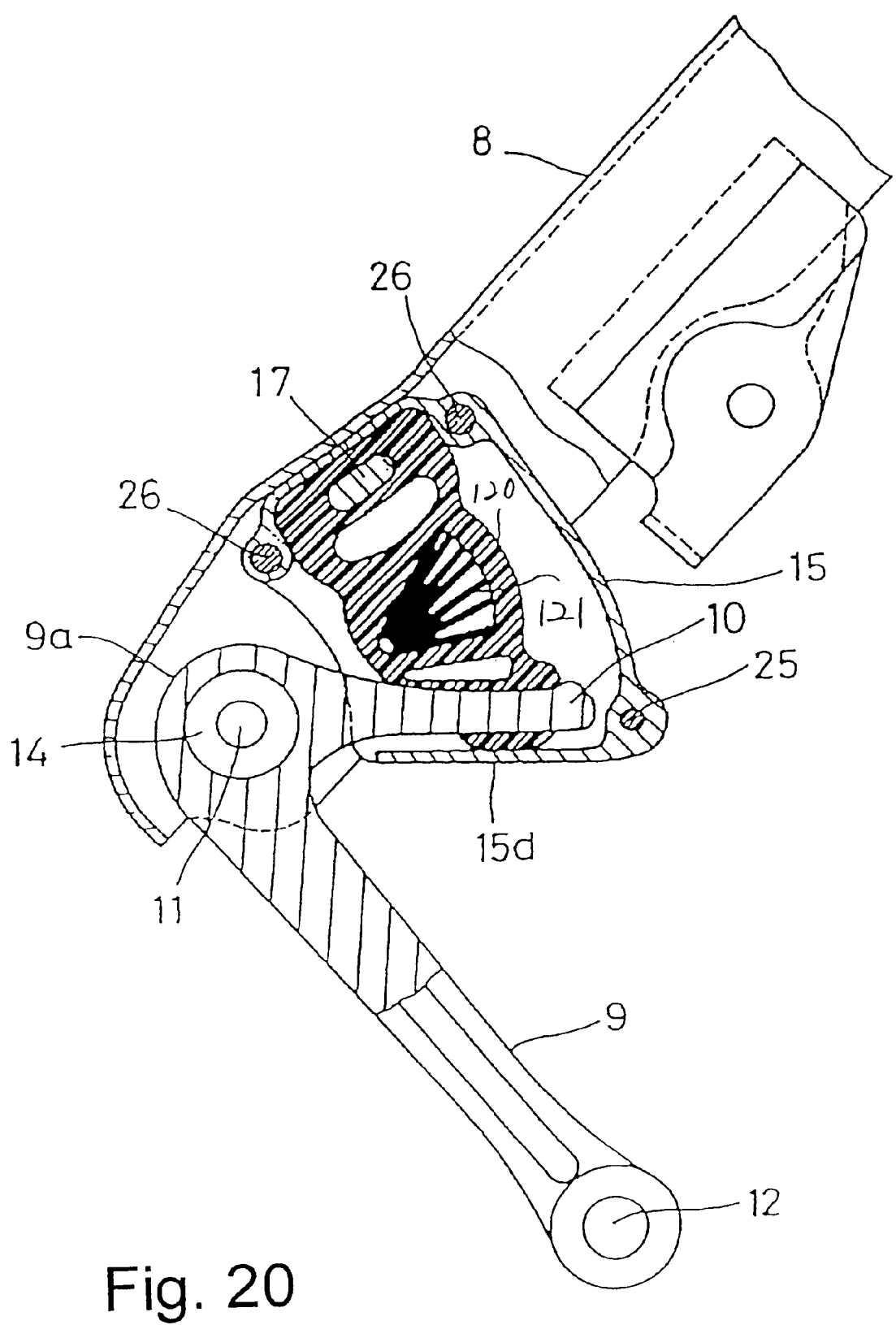
FIG. 20 is a sectional view showing a damping force generating mechanism of a wheel suspension.

The elastic rubber body 120 is contained in a case 15 in a state shown in FIG. 20. That is, with respect to the elastic rubber body 120, the front end portion is locked and positioned by a locking piece 17 passing through the front portion. A lever 10 is inserted in the slot 120f, and a projection 120a projecting rearwardly is brought into contact with a rear wall 15d of the case 15.

As described above, the front wheel suspension in this embodiment has a simple structure in which the elastic rubber body 120 containing the spring member 121 is interposed between a front forked portion 8 and the lever 10 in the state that the front portion of the elastic rubber body 120 is locked with the locking piece 17 and the rear portion of the elastic rubber body 120 is locked with the lever 10.

Figure 21:
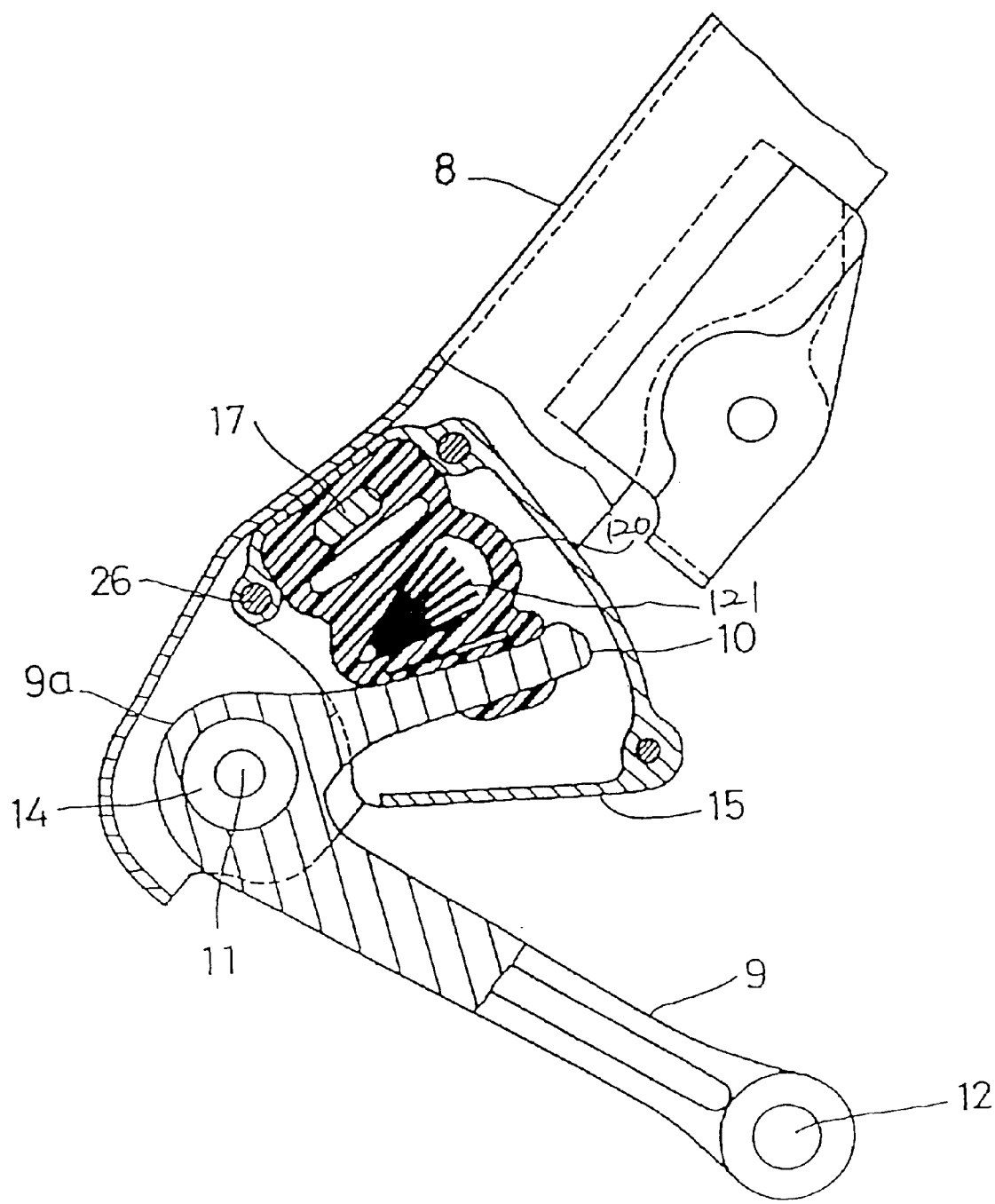
FIG. 21 is a sectional view showing the damping force generating mechanism of FIG. 20, which is in a state different from that in FIG. 20.

When a front wheel 13 is applied with shock generated by irregularities of the ground or a load upon braking and thereby the rocking arm 9 is rocked, the rocking arm 9 and the lever 10 integrated with the rocking arm 9 are rocked from a state shown in FIG. 20 to a state shown in FIG. 21. The lever 10 thus presses the elastic rubber body 120 forward onto the front forked portion 8, and it elastically deforms the elastic rubber body 120. As a result, the spring member 121 inserted in the elastic rubber body 120 is compressed and is made repulsive while generating an internal pressure.

Figure 22:
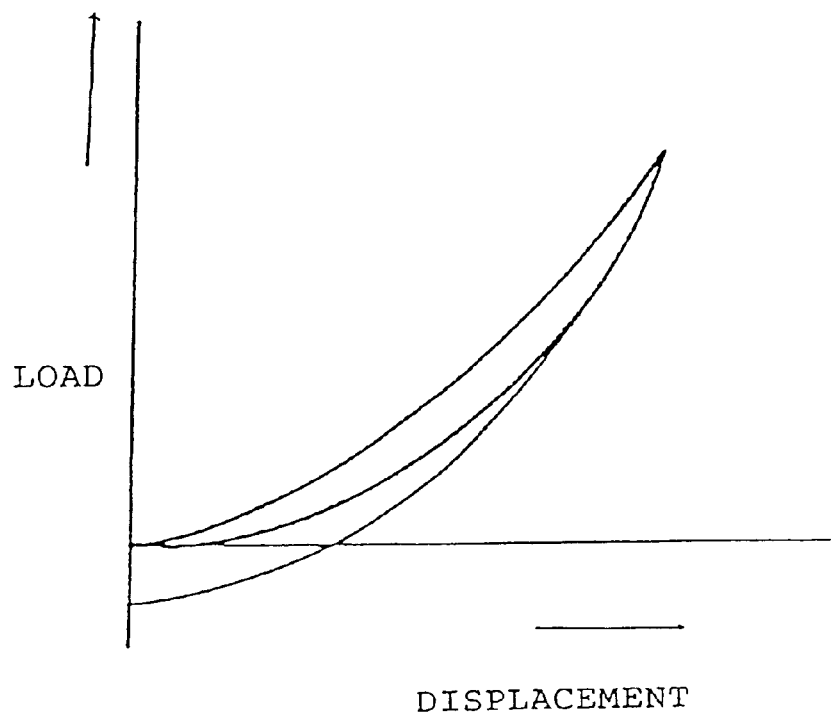
FIG. 22 is a graph showing an elastic characteristic of the damping force generating mechanism shown in FIG. 20.

In this case, the elastic rubber body 120 has an elastic characteristic shown in FIG. 22, in which the displacement of the elastic rubber body 120 is increased from the initial state having an initial strain to a sufficiently large value by increasing the applied load, and then the displacement is decreased along the hysteresis curve by decreasing the load and finally it becomes zero when the load reaches zero. Accordingly, the elastic rubber body 120 can ensure a large displacement and obtain sufficient energy absorption, and further it improves the initial strain.

Figure 23:
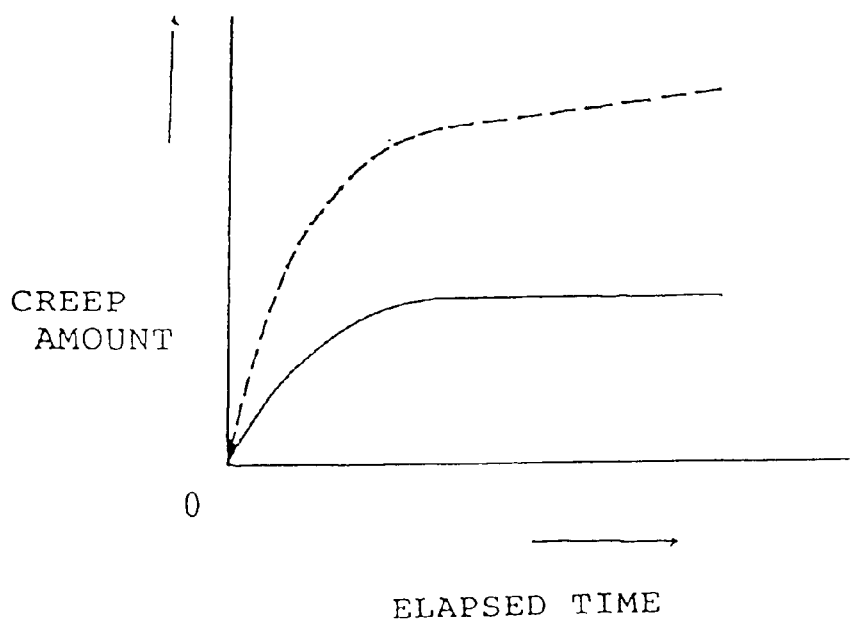
FIG. 23 is a graph showing a change in creep amount with an elapsed time for the damping force generating mechanism shown in FIG. 20.

The result of an experiment of examining the generation amount of creep of the elastic rubber body 120 containing the spring member 121 is shown in FIG. 23. In FIG. 23, an example of using the prior art elastic body not containing the spring member is shown by a broken line, and the example using the elastic rubber body 120 containing the spring member 121 is shown by a solid line. As is apparent from this figure, the creep amount of the elastic rubber body 120 is significantly reduced as compared with the prior art elastic body.

The characteristic change of the elastic rubber body 120 due to fatigue is thus small. Further, the elastic rubber body 120 is excellent in restoring ability after release of a load. That is, while the prior art elastic body causes approximately 100% of the permanent strain, the elastic rubber body 120 only causes approximately 40% of the permanent strain.

Figure 24:
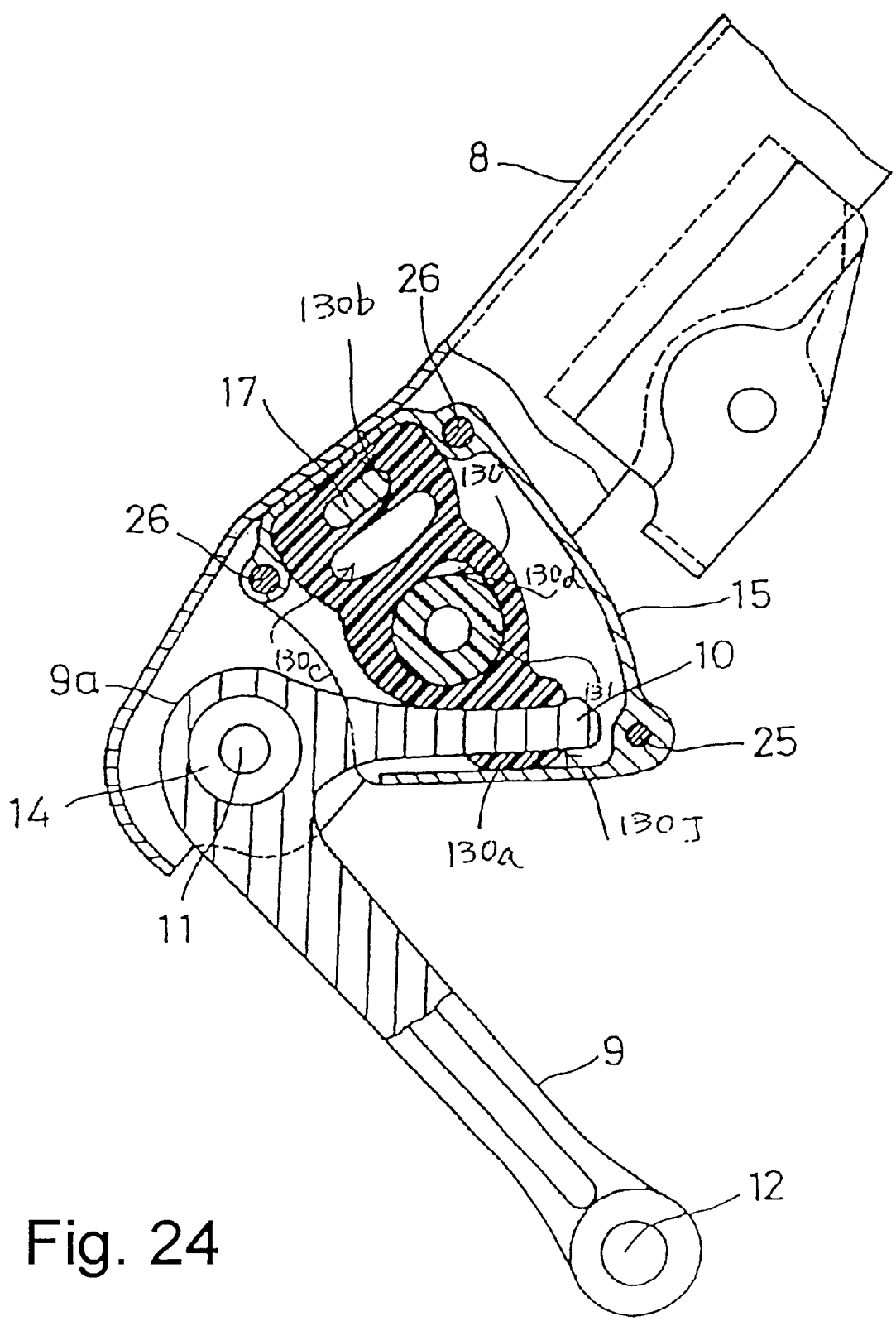
FIG. 24 is a sectional view of essential portions of a wheel suspension using a damping force generating mechanism according a modification of the second embodiment.
Figure 25:
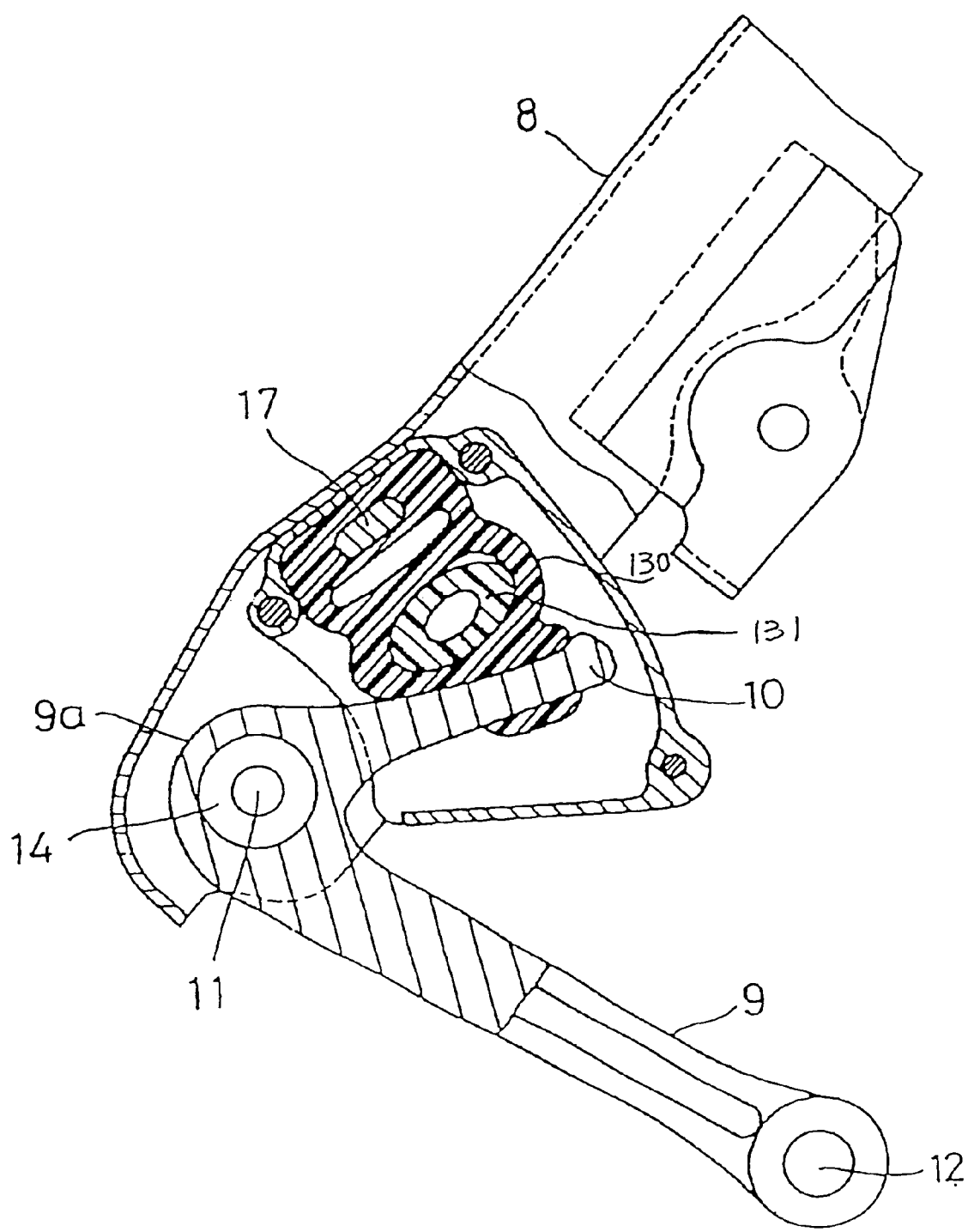
FIG. 25 is a sectional view of the essential portions of the damping force generating mechanism of FIG. 24, which is in a state different from that shown in FIG. 24.
Figure 26:
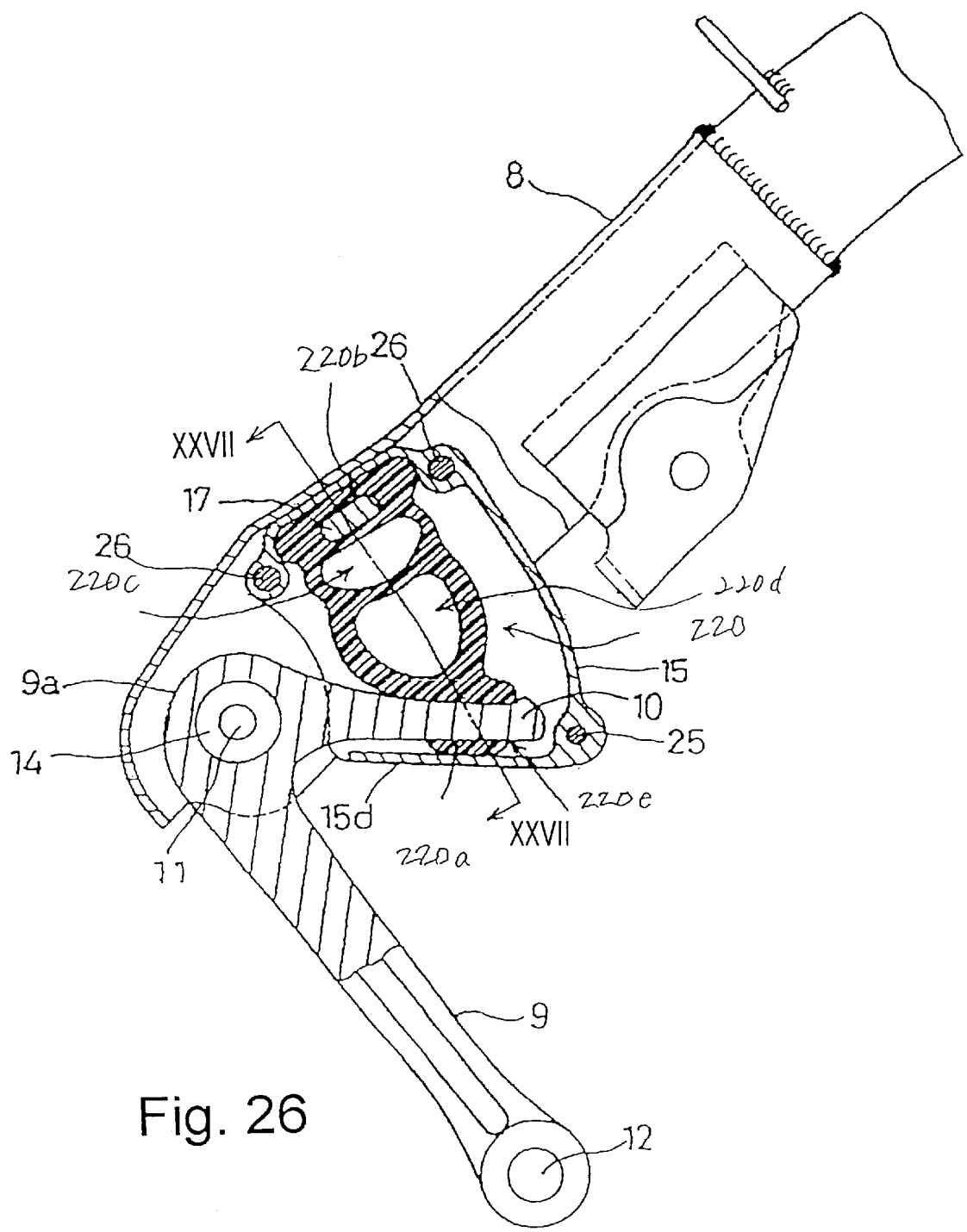
FIG. 26 is a view showing a damping force generating mechanism of a wheel suspension according to a third embodiment.

A modification of the second embodiment will be described with reference to FIGS. 24 and 25. The modification is the same as the second embodiment, except for an elastic body 130 and an internal pressure generating member 131 inserted in the elastic body 130. In this modification, parts corresponding to those in the second embodiment are indicated by the same characters.

The elastic body 130 is made from polyester elastomer and has an outer shape being substantially the same as that of the elastic body 120 in the second embodiment. Further, an elliptic hole 130b, and an irregularly elliptic hole 130c formed in the elastic body 130, and a slot 130f passing through the elastic body 130 along the base portion of a rear projection 130a are formed in the same shapes as those of the corresponding ones in the second embodiment. In this modification, however, the developed fan-shaped hole 120d and the contracted fan-shaped hole 120e are omitted, and instead, an irregular circular hole 130d is formed and an internal pressure generating member 131 is inserted in the irregular circular hole 130d.

The internal pressure generating member 131 is made from polyester-urethane being softer and more elastic than the elastic body 130 and is formed in a cylindrical shape having a specific wall thickness. When the elastic body 130 is applied with a load and a rocking arm 9 is rocked, the rocking arm 9 and a lever 10 integrated with the rocking arm 9 are rocked from a state shown in FIG. 24 to a state shown in FIG. 25, so that the lever 10 presses the elastic body 130 forward to a front forked portion 8 and thereby it elastically deforms the elastic body 130. In such a state, the internal pressure generating member 131 inserted in the elastic body 130 is compressed and is made repulsive while generating an internal pressure.

The elastic body 130 can ensure a large displacement and obtain a sufficient energy absorption, and it is significantly reduced in creep by the effect of the internal pressure generating member 131 and thereby it is small in characteristic change due to fatigue. Further, the elastic body 130 is excellent in restoring ability after release of a load.

In addition, the elastic body may be made from rubber in place of polyester-urethane. Also, with respect to the internal pressure generating member 131 made from polyester-urethane, the cylindrical hollow type may be replaced with a solid type. And, a different elastic substance may be inserted in the hollow portion of the elastic body.

The internal pressure generating member may be made from an organic material having a specific elasticity, in place of polyester-urethane. In this case, the organic material can be easily molded into a shape most effective to the application use of the elastic body.

Additionally, it may be considered to form an enclosed partition chamber containing a compressive gas or liquid in the elastic body. When the elastic body is pressed and deformed, the gas or liquid contained in the partition chamber is compressed to generate an internal pressure. Such an elastic body is allowed to be significantly reduced in creep and hence to be reduced in characteristic change, and also to enhance the restoring ability after release of a load.

Figure 27:
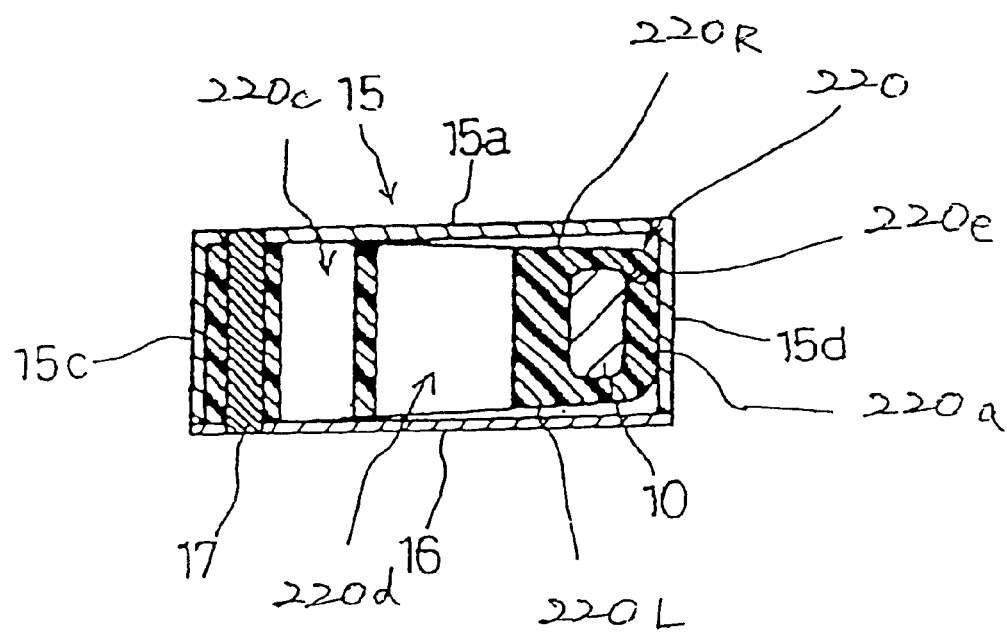
FIG. 27 is a sectional view taken on line XXXVII—XXXVII of FIG. 26.

A third embodiment of the present invention will be described with reference to FIGS. 26 to 30. In the third embodiment also concerning a front wheel suspension as in the previous embodiments, parts corresponding to those in the previous embodiments are indicated by the same characters. FIG. 27 shows the third embodiment using an elastic body 220 made from polyester elastomer. The elastic body 220 is formed in a shape being substantially similar to but smaller than that of the inner space of the case 15. The elastic body 220 has right and left side surfaces 220R and 220L which are substantially parallel to each other and are slightly curved in such a manner as to be gradually close to each other in the direction from the front side to the rear side, and it has a large projection 220a projecting from the rear portion thereof.

Three holes of different shapes are formed in the elastic rubber body 220 having such a contour. These holes, an elliptic hole 220b (corresponding to the elliptic hole 15e of the case 15 in the previous embodiment), an irregular elliptic hole 220c, and an irregular elliptic hole 220d are arranged from the front side in this order. Further, a slot hole 220e is formed which passes through the base portion of the projection 220a along the rear surface of the elastic rubber body 220.

As shown in FIG. 27, the right and left side surfaces 220R and 220L of the elastic body 220 contained in the case 15 are respectively brought into contact with 10 a side wall 15a of the case 15 and a lid member 16 on the front side of the elastic body 220, that is, on the side locked with a locking piece 17, and they are gradually separated from the side wall 15a of the case 15 and the lid member 16 with the increased gap as nearing the rear 15 side. In this way, the front wheel suspension in this embodiment has a simple structure in which the elastic body 220 is interposed between a front forked portion 8 and a lever 10 in such a manner that the front portion thereof is locked with the locking piece 17 and the rear portion thereof is locked with the lever 10.

Figure 28:
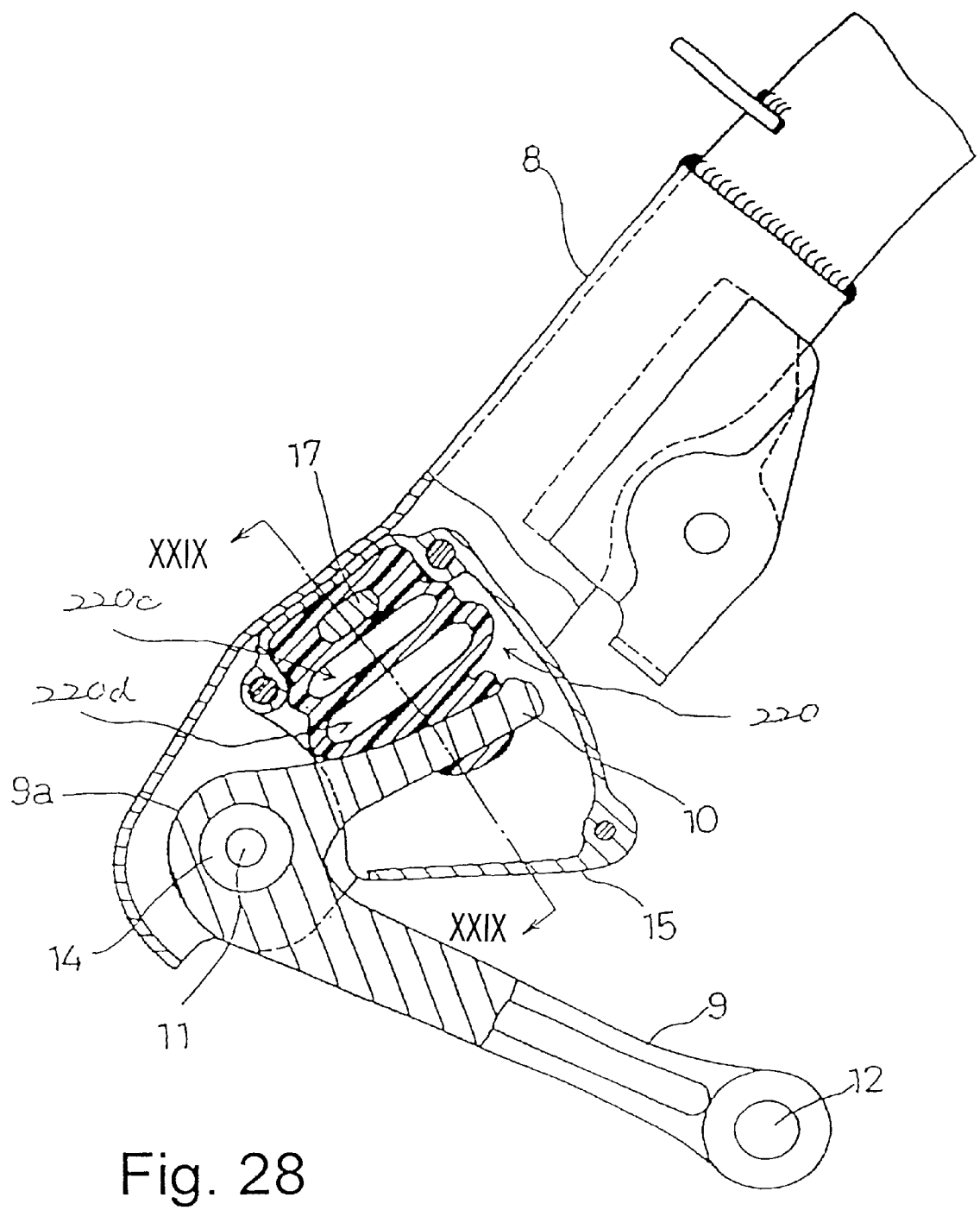
FIG. 28 is a sectional view showing the damping force generating mechanism of the wheel suspension of FIG. 26, which is in a state different from that in FIG. 26.
Figure 29:
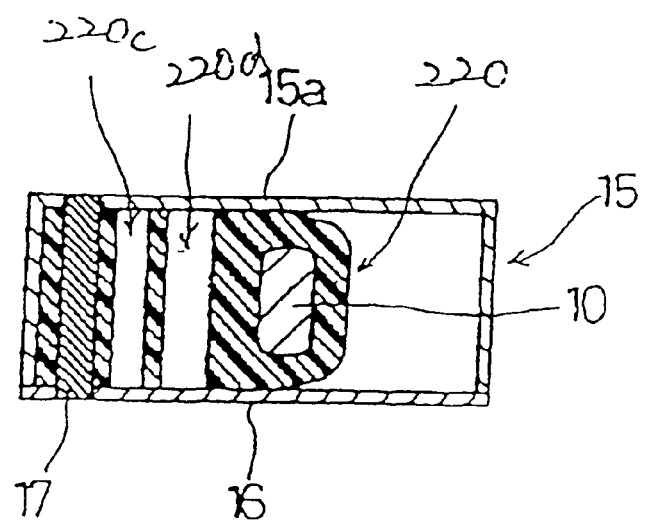
FIG. 29 is a sectional view taken on line XXIX—XXIX of FIG. 28.

When a front wheel 13 is applied with a shock generated by irregularities on the ground or a load upon braking and thereby the rocking arm 9 is rocked, the rocking arm 9 and the lever 10 integrated with the rocking arm 9 are rocked as shown in FIGS. 28 and 29, so that the lever 10 presses the elastic body 220 forward to the front forked portion 8 and thereby it elastically deforms the elastic body 220.

When being pressed, the elastic body 220 is expanded in the direction perpendicular to the pressing direction, that is, in the vertical direction and also in the right and left direction. The expansion of the elastic body 220 in the right and left direction causes the right and left side surfaces 220R and 220L to be swelled and to be respectively brought in contact with the side wall 15a of the case 15 and the lid member 16. Consequently, the expansion of the elastic body 220 is suppressed by the above contact, and as the pressing of the elastic body 220 proceeds, the contact area thereof is increased, so that the sliding resistance of the elastic body 220 at the contact surface of the right and left side surfaces 220R and 220L with the side wall 15a of the case 15 and the lid member 16 is increased. Thus, as the displacement (stroke) of the elastic body 220 is increased, the sliding resistance as well as the elastic force of the elastic body 220 is progressively increased.

Figure 30:
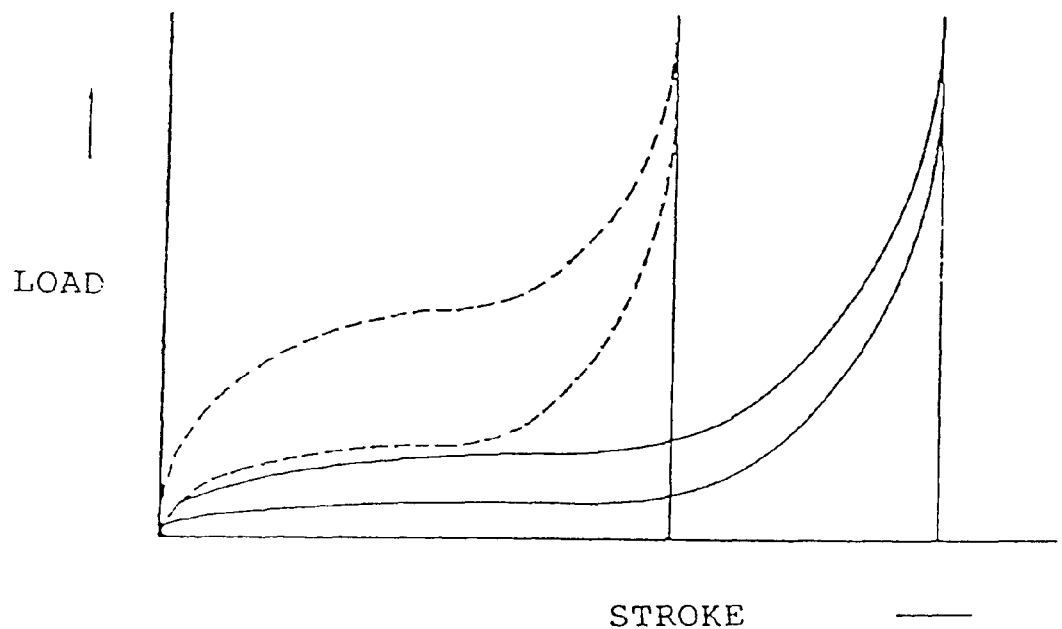
FIG. 30 is a graph showing an elastic characteristic of the damping force generating mechanism shown in FIG. 26.

The stroke-load characteristic in this embodiment is shown by a solid line of FIG. 30. The stroke-load characteristic forms a hysteresis curve. At the beginning of the motion of the elastic body 220, that is, when the stroke is small, the sliding resistance of the elastic body 220 is small and thereby the gradient of the curve of the load to the stroke is moderate. When the stroke becomes relatively large, the sliding resistance is added to the elastic force, and thereby the gradient of the curve is increased. When the stroke becomes very large, the gradient is further increased by the action of the progressively increased sliding resistance. In this way, the front wheel suspension in this embodiment exhibits the desirable damping effect.

The action of the sliding resistance can be easily adjusted by changing the shapes of the right and left side surfaces 220R and 220L of the elastic body 220, to thereby easily obtain a specific stroke-load characteristic.

Figure 31:
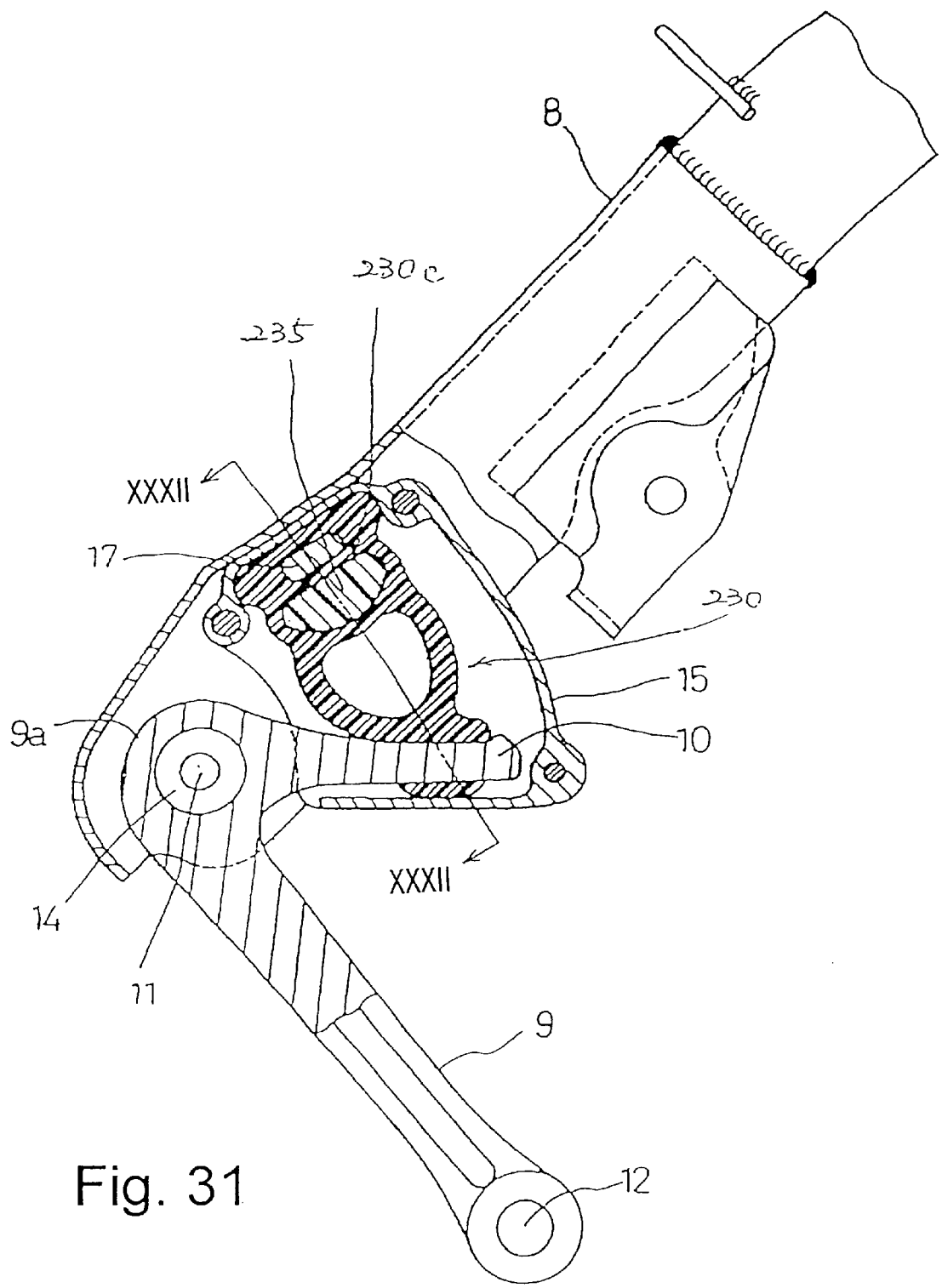
FIG. 31 is a sectional view of essential portions of a wheel suspension using a damping force generating mechanism according to a modification of the third embodiment.

A modification of the third embodiment will be described with reference to FIGS. 31 to 33. In the modification also concerning a front wheel suspension as in the third embodiment, parts corresponding to those in the third embodiment are indicated by the same characters. An elastic body 230 is formed into the same shape as that of the elastic body 220 in the third embodiment. However, in the elastic body 230, an intermediate elastic body 235 is inserted in an irregular elliptic hole 230C as one of hollow portions. The intermediate elastic body 235 is made from a material smaller in elastic modulus than the elastic body 230, that is, deformable easier than the elastic body 230.

Figure 32:
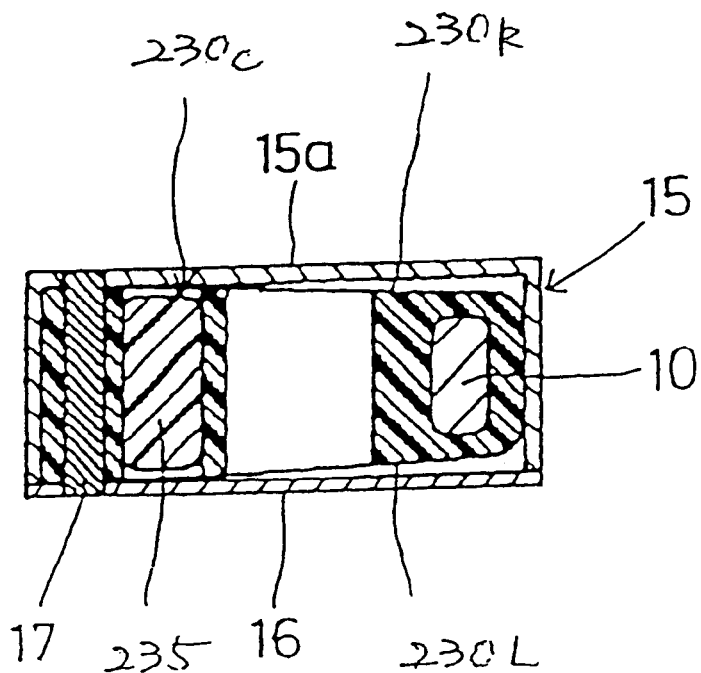
FIG. 32 is a transverse sectional view taken on line XXXII—XXXII of FIG. 31.
Figure 33:
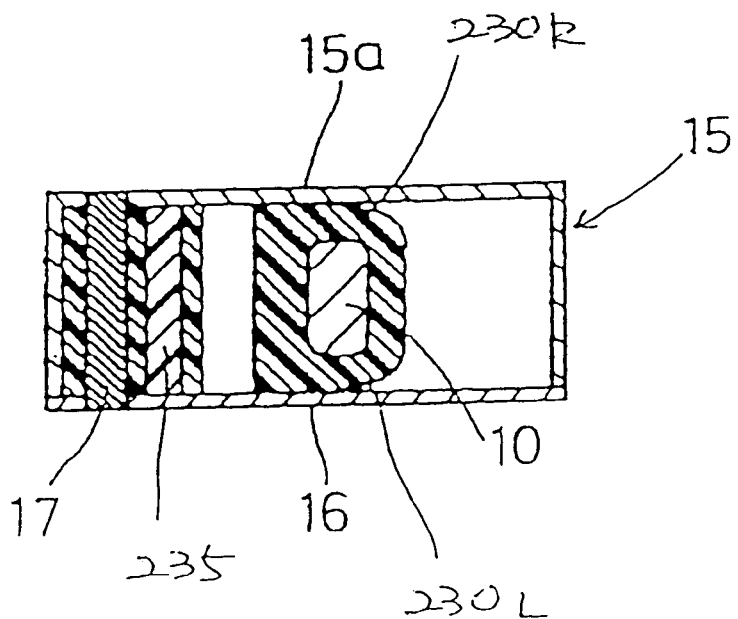
FIG. 33 is a sectional view of the damping force generating mechanism of FIG. 31, which is in a state different from that in FIG. 31.

In a state before the rocking arm 9 is rocked (see FIGS. 31 and 32), as shown in FIG. 32, the intermediate elastic body 235 is fitted in the irregular elliptic hole 230c, that is, not swelled from the right and left openings of the irregular elliptic hole 230c.

When the front wheel 13 is applied to shock generated by irregularities on the ground and the rocking arm 9 is rocked, the elastic body 230 is pressed and elastically deformed, so that the irregular elliptic hole 230c is also compressed in the pressing direction and it compresses the intermediate elastic body 235 contained in the hole 230c. At this time, the intermediate elastic body 235 made from a soft material is easily deformed, being expanded in the direction perpendicular to the compression direction, and is swelled from the right and left openings of the irregular elliptic hole 230c to be brought in contact with the side wall 15a of the case 15 and the lid member 16. The expansion of the intermediate elastic body 235 is thus suppressed by the above contact, and consequently the sliding resistance thereof at the contact surface is increased.

As described above, right and left side surfaces 230R and 230L of the elastic body 230 itself are brought in contact with the side wall 15a of the case 15 and the lid member 16 respectively, so that the sliding resistance of the elastic body 230 is increased. As a result, the elastic forces of the elastic body 230 and the intermediate elastic body 235 and the sliding resistance of the elastic body 230 are further added with the sliding resistance of the intermediate elastic body 235. The stroke-load characteristic of the front wheel suspension having the above configuration is shown by a broken line of FIG. 30.

In the stroke-load characteristic of this modification, the gradient of the curve is rapidly raised in a early region with a small stroke, as compared with the characteristic of the third embodiment shown by the solid line. In this way, the front wheel suspension in this modification is allowed to change the stroke-load characteristic with a simple structure in which the intermediate elastic body 235 is inserted and hence to easily obtain a specific characteristic.

Another modification will be described with reference to FIGS. 34 and 35. This modification has the same basic structure as that of the previous modification shown in FIGS. 31 to 33, except that the shape of an elastic body 240 is slightly different from that of the above-described elastic body 230. In this modification, parts corresponding to those in the previous modification are indicated by the same characters.

The elastic body 240 having right and left side surfaces 240R and 240L parallel to each other is contained in the case 15 between the side wall 15a and the lid member 16 with gaps therebetween. As shown in FIG. 35, even when the elastic body 240 is pressed, the right and left side surfaces 240R and 240L are not brought in contact with the side wall 15a and the lid member 16 with gaps kept therebetween. Accordingly, upon pressing of the elastic body 240, the expansion thereof is not restricted, differently from the elastic body 230 in the previous modification.

Figure 34:
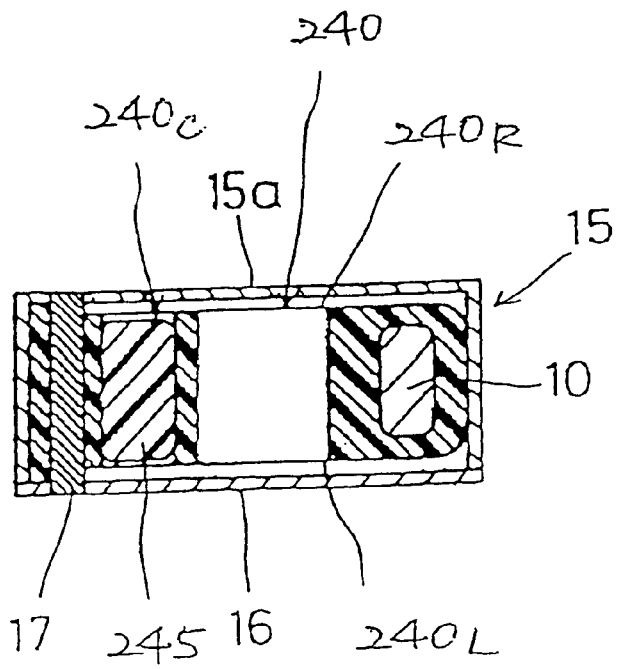
FIG. 34 is a sectional view of essential portions of a wheel suspension using a damping force generating mechanism according to another modification of the third embodiment.
Figure 35:
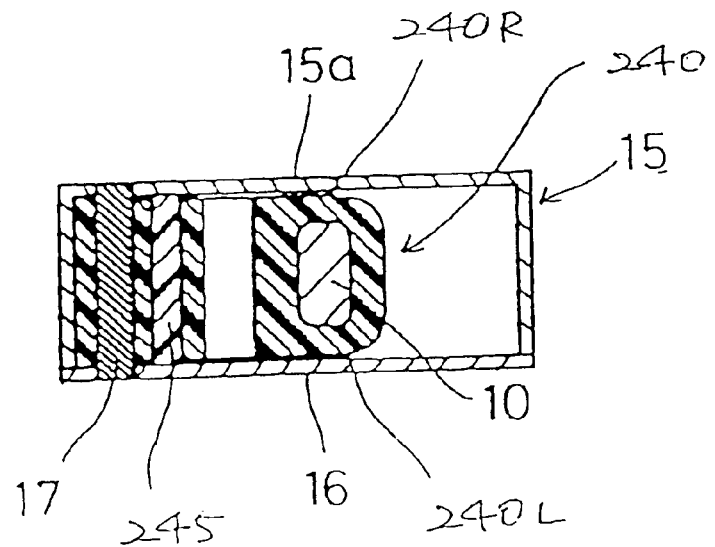
FIG. 35 is a sectional view of the damping force generating mechanism of FIG. 34, which is in a state different from that in FIG. 34.

An intermediate elastic body 245 is inserted in an irregular elliptic hole 240c of the elastic body 240, and as shown in FIG. 34, before the elastic body 240 is pressed, the intermediate elastic body 245 is contained in the irregular elliptic hole 240c. However, as shown in FIG. 35, when the elastic body 240 is pressed, the intermediate elastic body 245 is compressed and expanded in the direction perpendicular to the compression direction, being swelled from the right and left openings of the irregular elliptic hole 240c, and is brought in contact with the side wall 15a of the case 15 and the lid member 16. The expansion of the intermediate elastic body 245 is thus suppressed by the above contact, and thereby the sliding resistance thereof at the contact surface is increased.

Accordingly, when the elastic body 240 is pressed, the elastic force of the elastic body 240 is added with the sliding resistance of the intermediate elastic body 245, so that there can be obtained a stroke-load characteristic different from that in the previous modification.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle comprising:
a body having a front end and a rear end;
at least one rear wheel located at said rear end;
a front frame member having a rocking arm pivotally attached thereto, said rocking arm having a wheel support member and a lever arm angularly displaced from one another;
at least one front wheel rotatably attached to said wheel support member of said rocking arm; and
a suspension arrangement operatively arranged between said front frame member and said lever arm of said rocking arm, said suspension arrangement including a damping force generating mechanism having an elastic body which generates a damping force when compressed by a pressing force applied thereto,
wherein said elastic body includes a first hollow chamber and a second hollow chamber located therein.

2. The vehicle according to claim 1, wherein said damping force generating mechanism includes an internal pressure generating member located within said elastic body which generates a pressure opposed to the pressing force.

3. The vehicle according to claim 2, wherein said internal pressure generating member comprises a spring member.

4. The vehicle according to claim 2, wherein said internal pressure generating member comprises a partitioned chamber containing a compressive gas or liquid.

5. The vehicle according to claim 2, wherein said internal pressure generating member comprises an organic material having an elasticity.

6. The vehicle according to claim 1, wherein said damping force generating mechanism further comprises a restricting wall for suppressing expansion of said elastic body in a direction perpendicular to the pressing direction of said elastic body, and wherein said first hollow chamber includes an opening opened toward said restricting wall, and an intermediate elastic body is located within said first hollow chamber, whereby when said elastic body is pressed, said intermediate elastic body is compressed, being swelled out of the opening of said first hollow chamber, and is brought into pressing contact with said restricting wall.

7. The vehicle according to claim 1, wherein said elastic body includes a progressive elastic characteristic when compressed such that with initial compression amounts of said elastic body, only said first hollow chamber is deformed, and with increasing compression amounts of said elastic body, both said first hollow chamber and said second hollow chamber are deformed.

8. The vehicle according to claim 1, wherein said elastic body includes a progressive elastic characteristic when compressed such that with initial compression amounts of said elastic body, compressive stresses within said elastic body increase at a first rate with respect to said compression amounts, and with increasing compression amounts of said elastic body, compressive stresses within said elastic body increase at a second rate with respect to said compression amounts which is greater than said first rate.

9. The vehicle according to claim 1, wherein said elastic body includes a progressive elastic characteristic when compressed such that with initial compression amounts of said elastic body, only said first hollow chamber is deformed and compressive stresses within said elastic body increase at a first rate with respect to said compression amounts, and with increasing compression amounts of said elastic body, both said first hollow chamber and said second hollow chamber are deformed and compressive stresses within said elastic body increase at a second rate with respect to said compression amounts which is greater than said first rate.

10. A vehicle comprising:

a frame;

a steering member rotatably supported by said frame;

a rocking arm pivotally attached to said steering, member, said rocking arm comprising a wheel support member and a lever angularly oriented with respect to one another;

a front wheel rotatably attached to said wheel support member of said rocking arm; and a suspension arrangement operatively arranged between said steering member and said lever, said suspension arrangement including a damping force generating mechanism comprising an elastic body which generates a damping force when compressed by a pressing force applied thereto in a pressing direction, wherein said elastic body includes a first hollow chamber and a second hollow chamber located therein.

11. The vehicle according to claim 10, wherein said first hollow chamber has a larger volume than said second hollow chamber.

12. The vehicle according to claim 10, wherein said first hollow chamber is irregularly shaped, and said second hollow chamber is cylindrical.

13. The vehicle according to claim 10, wherein said first hollow chamber and said second hollow chamber are arranged one after another along said pressing direction.

14. The vehicle according to claims 10, wherein said elastic body includes a progressive elastic characteristic when compressed such that with initial compression amounts of said elastic body, only said first hollow chamber is deformed, and with increasing compression amounts of said elastic body, both said first hollow chamber and said second hollow chamber are deformed.

15. The vehicle according to claim 10, wherein said elastic body includes a progressive elastic characteristic when compressed such that with initial compression amounts of said elastic body, compressive stresses within said elastic body increase at a first rate with respect to said compression amounts, and with increasing compression amounts of said elastic body, compressive stresses within said elastic body increase at a second rate with respect to said compression amounts which is greater than said first rate.

16. The vehicle according to claim 10, wherein said elastic body includes a progressive elastic characteristic when compressed such that with initial compression amounts of said elastic body, only said first hollow chamber is deformed and compressive stresses within said elastic body increase at a first rate with respect to said compression amounts, and with increasing compression amounts of said elastic body, both said first hollow chamber and said second hollow chamber are deformed and compressive stresses within said elastic body increase at a second rate with respect to said compression amounts which is greater than said first rate.

17. The vehicle according to claim 10, further comprising an internal pressure generating member located within said first hollow chamber of said elastic body which generates a pressure opposed to the pressing force.

18. The vehicle according to claim 17, wherein said internal pressure generating member comprises a spring member.

19. The vehicle according to claim 18, wherein said spring member comprises a plurality of radially extending metal plate springs arranged in a fan shape.

20. The vehicle according to claim 17, wherein said internal pressure generating member comprises a partitioned chamber containing a compressive gas.

21. The vehicle according to claim 17, wherein said internal pressure generating member comprises an organic material having an elasticity.

22. The vehicle according to claim 10, wherein said damping force generating mechanism further includes a restricting wall for suppressing expansion of said elastic body in a direction perpendicular to the pressing direction of said elastic body.

23. The vehicle according to claim 22, wherein said elastic body has a first hollow chamber with an opening opened toward said restricting wall, and an intermediate elastic body is located within said first hollow chamber, whereby when said elastic body is pressed, said intermediate elastic body is compressed, being swelled out of said opening of said first hollow chamber, and is brought into pressing contact with said restricting wall.

24. The vehicle according to claim 22, wherein said elastic body is separated from said restricting wall with a gap located therebetween at a beginning of pressing of said elastic body, and said elastic body is brought into contact with said restricting wall with progressive pressing of said elastic body.

* * * * *